United States Patent
Faxér et al.

(10) Patent No.: US 11,374,718 B2
(45) Date of Patent: Jun. 28, 2022

(54) CHANNEL STATE INFORMATION REPORTING WITHOUT UPLINK SHARED CHANNEL

(71) Applicant: Telefonaktiebolaget LM Ericsson (publ), Stockholm (SE)

(72) Inventors: Sebastian Faxér, Järfälla (SE); Sara Sandberg, Luleå (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 74 days.

(21) Appl. No.: 16/961,416

(22) PCT Filed: Jan. 10, 2019

(86) PCT No.: PCT/EP2019/050593
§ 371 (c)(1),
(2) Date: Jul. 10, 2020

(87) PCT Pub. No.: WO2019/138016
PCT Pub. Date: Jul. 18, 2019

(65) Prior Publication Data
US 2020/0382256 A1 Dec. 3, 2020

Related U.S. Application Data

(60) Provisional application No. 62/617,102, filed on Jan. 12, 2018.

(51) Int. Cl.
*H04L 5/00* (2006.01)
*H04L 1/00* (2006.01)
*H04W 72/04* (2009.01)

(52) U.S. Cl.
CPC .......... *H04L 5/0053* (2013.01); *H04L 1/0009* (2013.01); *H04W 72/042* (2013.01)

(58) Field of Classification Search
CPC ... H04L 5/0053; H04L 1/0009; H04L 5/0057; H04L 1/0026; H04W 72/1236
See application file for complete search history.

(56) References Cited

U.S. PATENT DOCUMENTS

2011/0299484 A1* 12/2011 Nam .................... H04L 1/0026
370/329
2012/0182944 A1* 7/2012 Sorrentino ........... H04L 5/0044
370/329

(Continued)

FOREIGN PATENT DOCUMENTS

WO 2011053970 A2 5/2011
WO 2011053970 A3 5/2011

OTHER PUBLICATIONS

International Search Report and Written Opinion dated Mar. 29, 2019 for International Application No. PCT/EP2019/050593 filed on Jan. 10, 2019, consisting of 9-pages.

(Continued)

*Primary Examiner* — Diane L Lo
*Assistant Examiner* — Abusayeed M Haque
(74) *Attorney, Agent, or Firm* — Christopher & Weisberg, P.A.

(57) ABSTRACT

A network node configured to communicate with a wireless device is provided. The network node includes processing circuitry configured to indicate, for channel state information, CSI, reporting, a configuration of a physical uplink shared channel, PUSCH, without associated shared channel data, at least in part by: toggling a new data indicator and setting a modulation and coding scheme field where the set modulation and coding scheme field lacks an indication of a target code rate. Optionally CSI reporting is received based at least in part on the indication for CSI reporting.

18 Claims, 12 Drawing Sheets

(56) References Cited

U.S. PATENT DOCUMENTS

| | | | |
|---|---|---|---|
| 2018/0338319 A1* | 11/2018 | Kim | H04W 72/1278 |
| 2019/0158216 A1* | 5/2019 | Suzuki | H04L 5/0053 |
| 2019/0173562 A1* | 6/2019 | Yu | H04B 7/0695 |
| 2020/0015090 A1* | 1/2020 | Feng | H04W 72/0446 |
| 2020/0029352 A1* | 1/2020 | Aiba | H04W 72/14 |
| 2020/0304178 A1* | 9/2020 | Wei | H04L 5/0023 |
| 2021/0136611 A1* | 5/2021 | Tang | H04W 24/10 |
| 2021/0288705 A1* | 9/2021 | Lee | H04B 7/0626 |

OTHER PUBLICATIONS

3GPP TSG RAN WG1 Meeting #66 R1-112232; Title: Discussions of UCI-only Transmission on PUSCH; Agenda Item: 6.7.2; Document for: Discussion on Decision; Source: Intel Corporation; Athens, Greece, Aug. 22-26, 2011, consisting of 5-pages.

3GPP TS 38.214 V15.1.0 (Mar. 2018); 3rd Generation Partnership Project; Technical Specification Group Radio Access Network; NR; Physical layer procedures for data (Release 15); Mar. 2018, consisting of 77-pages.

Indian Office Action dated Aug. 25, 2021 for Patent Application No. 202017029289, consisting of 7-pages.

* cited by examiner

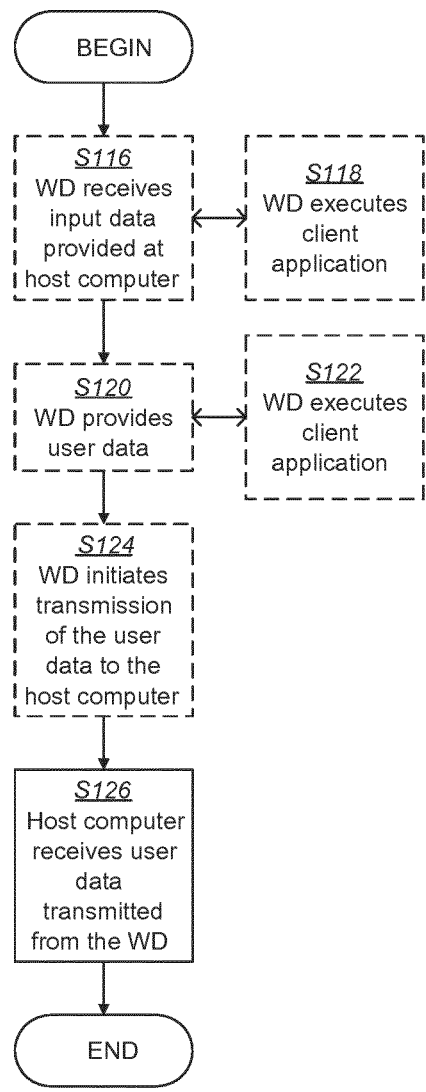
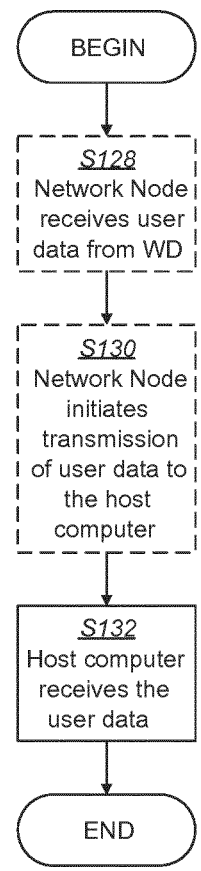
FIG. 11
FIG. 12

CHANNEL STATE INFORMATION REPORTING WITHOUT UPLINK SHARED CHANNEL

CROSS-REFERENCE TO RELATED APPLICATIONS

This application is a Submission Under 35 U.S.C. § 371 for U.S. National Stage Patent Application of International Application No.: PCT/EP2019/050593, filed Jan. 10, 2019 entitled "CHANNEL STATE INFORMATION REPORTING WITHOUT UPLINK SHARED CHANNEL," which claims priority to U.S. Provisional Application No. 62/617,102, filed Jan. 12, 2018, entitled "INDICATING CHANNEL STATE INFORMATION-ONLY PHYSICAL UPLINK SHARED CHANNEL WITHOUT UPLINK SHARED CHANNEL," the entireties of both of which are incorporated herein by reference.

TECHNICAL FIELD

The present disclosure relates to wireless communications, and in particular, to indicating a channel state information (CSI)-only physical uplink shared channel (PUSCH) without associated shared channel data.

BACKGROUND

The next generation mobile wireless communication system (5G) or new radio (NR), is expected to support a diverse set of use cases and a diverse set of deployment scenarios. The deployment scenarios include deployment at both low frequencies (100s of MHz), similar to Long Term Evolution (LTE), and very high frequencies (mm waves in the tens of GHz).

Similar to LTE, NR will use orthogonal frequency division multiplexing (OFDM) in the downlink (i.e. from a network node, gNB, eNB, or base station, to a wireless device). In the uplink (i.e. from the wireless device to network node such as a gNB), both discrete Fourier transform (DFT)-spread OFDM and OFDM will be supported.

The basic NR physical resource can thus be seen as a time-frequency grid as illustrated in FIG. 1, where each resource element corresponds to one OFDM subcarrier during one OFDM symbol interval. Resource allocation in a slot is described in terms of resource blocks (RBs) in the frequency domain and number of OFDM symbols in the time domain. A RB corresponds to 12 contiguous subcarriers and a slot consists of 14 OFDM symbols.

Different subcarrier spacing values are supported in NR. The supported subcarrier spacing values (also referred to as numerologies) in NR are given by $\Delta f=(15 \times 2^\alpha)$ kHz where $\alpha$ is a non-negative integer.

In the time domain, downlink and uplink transmissions in NR are organized into equally-sized subframes similar to LTE as shown in FIG. 2. A subframe is further divided into slots and the number of slot per subframe is $2^{\alpha+1}$ for a numerology of $(15 \times 2^\alpha)$ kHz.

NR supports "slot based" transmission. In each slot, the gNB transmits downlink control information (DCI) about which wireless device data is to be transmitted to and what resources in the current downlink subframe the data is transmitted on. The DCI is carried on the Physical Control Channel (PDCCH) and data is carried on Physical Downlink Shared Channel (PDSCH).

This PDCCH is typically transmitted in control resource sets (CORSETs) in the first few OFDM symbols in each slot. A wireless device first decodes a PDCCH and if a PDCCH is decoded successfully, it then decodes the corresponding PDSCH based on the decoded DCI in the PDCCH.

Uplink data transmissions are also dynamically scheduled using PDCCH. Similar to downlink, a wireless device first decodes an uplink grant in a DCI carried by PDCCH and then transmits data over the Physical Uplink Shared Channel (PUSCH), based on the decoded control information in the uplink grant such as modulation order, coding rate, uplink resource allocation, etc.

Each wireless device is assigned with a unique C-RNTI (Cell Radio Network Temporary Identifier) during network connection. The CRC (cyclic redundancy check) bits attached to a DCI for a wireless device is scrambled by the wireless device's C-RNTI, so a wireless device recognizes its own DCI by checking the CRC bits of the DCI against the assigned C-RNTI.

DCI format for scheduling PUSCH:

For UL scheduling over PUSCH, at least the following bit fields are included in a UL DCI where some of the bit field sizes/lengths are indicated:

Frequency domain resource assignment
Time domain resource assignment
Modulation and coding scheme (MCS)—5 bits
New data indicator (NDI)—1 bit
Redundancy version index (RVid)—2 bits, indicating a redundancy version (RVid=0,1,2,3)
HARQ (hybrid automatic repeat request) process number—4 bits
TPC command for scheduled PUSCH—2 bits
CSI (channel state information) request—0, 1, 2, 3, 4, 5, or 6 bits determined by higher layer parameter ReportTriggerSize.

The MCS field indicates a modulation and coding scheme as defined by modulation order and target code rate according to the below, e.g., Table 6.1.4.1-1 from Third Generation Partnership Project (3GPP) Technical Specification (TS) 38.214 for the 64QAM MCS table:

| MCS Index $I_{MCS}$ | Modulation Order $Q_m$ | Target code Rate × 1024 R | Spectral efficiency |
|---|---|---|---|
| 0 | 1 | 240 | 0.2344 |
| 1 | 1 | 314 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | 1 | reserved | |

-continued

| MCS Index $I_{MCS}$ | Modulation Order $Q_m$ | Target code Rate × 1024 R | Spectral efficiency |
|---|---|---|---|
| 29 | 2 | reserved | |
| 30 | 4 | reserved | |
| 31 | 6 | reserved | |

CSI Reporting

Channel state information (CSI) feedback is used by gNB to obtain DL CSI from a wireless device in order to determine how to transmit DL data to a wireless device over plurality of antenna ports. CSI typically includes a channel rank indicator (RI), a precoding matrix indicator (PMI) and a channel quality indicator (CQI). RI is used to indicate the number of data layers that can be transmitted simultaneously to a wireless device, PMI is used to indicate the precoding matrix over the indicated data layers, and CQI is used to indicate the modulation and coding rate can be achieved by with the indicated rank and the precoding matrix.

In NR, in addition to periodic and aperiodic CSI reporting as in LTE, semi-persistent CSI reporting is also supported. Thus, three types of CSI reporting will be supported in NR as follows:

Periodic CSI (P-CSI) Reporting on PUCCH: CSI is reported periodically by a wireless device. Parameters such as periodicity and slot offset are configured semi-statically by higher layer RRC signaling from the gNB to the wireless device.

Aperiodic CSI (A-CSI) Reporting on PUSCH: This type of CSI reporting involves a single-shot (i.e., one time) CSI report by a wireless device which is dynamically triggered by the gNB using DCI. Some of the parameters related to the configuration of the aperiodic CSI report is semi-statically configured by RRC but the triggering is dynamic.

Semi-Persistent CSI (SP-CSI) Reporting on PUSCH: similar to periodic CSI reporting, semi-persistent CSI reporting has a periodicity and slot offset which may be semi-statically configured. However, a dynamic trigger from gNB to wireless device may be needed to allow the wireless device to begin semi-persistent CSI reporting. A dynamic trigger from gNB to wireless device is needed to request the wireless device to stop the semi-persistent CSI reporting.

CSI Reference Signal (CSI-RS)

The CSI-RS is used for measuring downlink CSI by a wireless device. CSI-RS is transmitted over each transmit (Tx) antenna port at the network node and for different antenna ports, the CSI-RS are multiplexed in time, frequency and code domain such that the channel between each Tx antenna port at the network node, and each receive antenna port at a wireless device can be measured by the wireless device. A time frequency resource used for transmitting CSI-RS is referred to as a CSI-RS resource.

CSI framework in NR:

In NR, a wireless device can be configured with N≥1 CSI reporting settings (i.e. ReportConfigs), M≥1 resource settings (i.e. ResourceConfigs), and 1 CSI measurement setting, where the CSI measurement setting includes L≥1 Measurement Links (i.e. MeasLinkConfigs). At least the following configuration parameters are signaled via RRC for CSI acquisition:

1. N, M, and L are indicated either implicitly or explicitly
2. In each CSI reporting setting, at least the following are included:
    reported CSI parameter(s) such as RI, PMI, CQI
    CSI Type if reported such as Type I or Type II
    Codebook configuration including codebook subset restriction
    Time-domain behavior such as P-CSI, SP-CSI, or A-CSI
    Frequency granularity for CQI and PMI such as wideband, partial band, or subband
    Measurement restriction configurations such as RBs in frequency domain and slots in time domain
3. In each CSI-RS resource setting:
    A configuration of S≥1 CSI-RS resource set(s)
    A configuration of $K_s$≥1 CSI-RS resources for each resource set s, including at least: mapping to REs, the number of antenna ports, time-domain behavior, etc.
    Time domain behavior: aperiodic, periodic or semi-persistent
4. In each of the L links in CSI measurement setting:
    CSI reporting setting indication, Resource setting indication, quantity to be measured (either channel or interference)
    One CSI reporting setting can be linked with one or multiple Resource settings
    Multiple CSI reporting settings can be linked to one resource setting
    A-CSI Reporting on PUSCH A-CSI reporting over PUSCH is triggered by a DCI for scheduling PUSCH, or UL DCI as illustrated in FIG. 3. A special CSI request bit field in the DCI is defined for the purpose. Each value of the CSI request bit field defines a codepoint and each codepoint can be associated with a higher layer configured CSI report trigger state. For A-CSI reporting, the CSI report trigger states contains a list of $S_c$ measurement links associated with A-CSI reporting. Each CSI report trigger state defines at least the following information:

Resource configurations
    a) CSI reference signal (CSI-RS) resource for channel measurement
    b) Interference measurement resource for interference measurement
CSI report configuration:
    a) The type of CSI report, i.e. wideband or subband, Type I or Type II codebook used, etc.

The bit width, $L_c$, of the CSI request field is configurable from 0 to 6 bits. When the number of CSI triggering states, $S_c$, is larger than the number of codepoints, i.e. $S_c > 2^{L_c}$, MAC (Medium Access Control) CE (control element) is used to select a subset of $2^{L_c}-1$ triggering states from the $S_c$ triggering states so that there is a one-to-one mapping between each codepoint and a CSI triggering state. The −1 arises because setting the CSI request field to zeroes indicates no triggered report.

SUMMARY

Some embodiments advantageously provide methods, systems, and apparatuses for indicating and detecting CSI-only PUSCH without UL-SCH. A CSI-only PUSCH without UL-SCH may be indicated by:
    Toggling the New Data Indicator, NDI;
    Setting the MCS field to a reserved state not indicating target code rate;
    Triggering CSI reporting by setting the CSI request field not equal to zeros; and
    (Optionally) Setting RVid to a certain value not equal to zero (such as 1);

CSI-only PUSCH can be indicated without limiting the flexibility of how PUSCH comprising UL-SCH can be indicated. Furthermore, by allowing transmission of CSI-only PUSCH using a modulation order suitable for the channel conditions, the amount of time-frequency resources needed for transmission of the CSI on CSI-only PUSCH may be reduced.

According to one aspect of the disclosure, a network node configured to communicate with a wireless device is provided. The network node includes processing circuitry configured to: indicate, for channel state information, CSI, reporting, a configuration of a physical uplink shared channel, PUSCH, without associated shared channel data, wherein the indication comprises: toggling a new data indicator; and setting a modulation and coding scheme field, the set modulation and coding scheme field lacking an indication of a target code rate. The processing circuitry is further configured to optionally receive CSI reporting based at least in part on said indication for CSI reporting.

According to one or more embodiments of this aspect, the processing circuitry is further configured to set a CSI request field to trigger CSI reporting as part of the indication, for CSI reporting, of the configuration of the PUSCH without the associated shared channel data. According to one or more embodiments of this aspect, the CSI request field is set to include at least one non-zero value. According to one or more embodiments of this aspect, the processing circuitry is further configured to set a redundancy version field to a predefined value as part of the indication, for CSI reporting, of the configuration of the PUSCH without the associated shared channel data.

According to one or more embodiments of this aspect, the redundancy version field is set to 1. According to one or more embodiments of this aspect, the new data indicator and the modulation and coding scheme field are included in downlink control information, DCI. According to one or more embodiments of this aspect, the indication, for CSI reporting, of the configuration of the PUSCH without the associated shared channel data is indicated in downlink control information, DCI, that is configured to omit an indication of a transport block size for the shared channel data.

According to another aspect of the disclosure, a method for indicating channel state information, CSI, reporting without associated shared channel data is provided. A new data indicator is toggled. A modulation and coding scheme field is set where the set modulation and coding scheme field lacking an indication of a target code rate. The toggling of the new data indicator and the set modulation and coding scheme field is indicated to a wireless device.

According to one or more embodiments of this aspect, CSI reporting is received based at least in part on said indication for CSI reporting. According to one or more embodiments of this aspect, a CSI request field is set to trigger CSI reporting as part of the indication, for CSI reporting, of the configuration of the PUSCH without the associated shared channel data. According to one or more embodiments of this aspect, the CSI request field is set to include at least one non-zero value. According to one or more embodiments of this aspect, a redundancy version field is set to a predefined value as part of the indication, for CSI reporting, of the configuration of the PUSCH without the associated shared channel data.

According to one or more embodiments of this aspect, the redundancy version field is set to 1. According to one or more embodiments of this aspect, the new data indicator and the modulation and coding scheme field are included in downlink control information, DCI. According to one or more embodiments of this aspect, the indication, for CSI reporting, of the configuration of the PUSCH without the associated shared channel data is indicated in downlink control information, DCI, that is configured to omit an indication of a transport block size for the shared channel data.

According to another aspect of the disclosure, a wireless device configured to communicate with a network node is provided. The wireless device includes processing circuitry configured to: receive an indication, for channel state information, CSI, reporting, of a configuration of a physical uplink shared channel, PUSCH, without associated shared channel data, the indication corresponding at least in part to: a toggling of a new data indicator; and a setting of a modulation and coding scheme field, the set modulation and coding scheme field lacking an indication of a target code rate. The processing circuitry is further configured to optionally transmit CSI reporting based at least in part on said indication for CSI reporting.

According to one or more embodiments of this aspect, the indication further corresponds to a setting of a CSI request field to trigger CSI reporting. According to one or more embodiments of this aspect, the CSI request field is set to include at least one non-zero value. According to one or more embodiments of this aspect, the indication further corresponds to a setting of a redundancy version field to a non-zero value as part of the indication, for CSI reporting, of the configuration of the PUSCH without the associated shared channel data.

According to one or more embodiments of this aspect, the redundancy version field is set to 1. According to one or more embodiments of this aspect, the new data indicator and the modulation and coding scheme field are included in downlink control information, DCI. According to one or more embodiments of this aspect, the indication is indicated in downlink control information, DCI, that is configured to omit an indication of a transport block size for the shared channel data.

According to another aspect of the disclosure, a method performed by a wireless device for channel state information, CSI, reporting without associated shared channel data is provided. A new data indicator and modulation and coding scheme (MCS) field is received. An indication for channel state information reporting without associated shared channel data is determined at least in part based on the new data indicator being toggled and the MCS field lacking an indication of a target code rate.

According to one or more embodiments of this aspect, the indication for CSI reporting further corresponds to a setting of a CSI request field to trigger CSI reporting. According to one or more embodiments of this aspect, the CSI request field is set to include at least one non-zero value. According to one or more embodiments of this aspect, the indication further corresponds to a setting of a redundancy version field to a non-zero value as part of the indication, for CSI reporting, of the configuration of the PUSCH without the associated shared channel data. According to one or more embodiments of this aspect, the redundancy version field is set to 1.

According to one or more embodiments of this aspect, the new data indicator and the modulation and coding scheme field are included in downlink control information, DCI. According to one or more embodiments of this aspect, the indication is indicated in downlink control information, DCI, that is configured to omit an indication of a transport block size for the shared channel data. According to one or more embodiments of this aspect, CSI reporting is transmitted based at least in part on the indication.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 11 is a flowchart illustrating exemplary methods implemented in a communication system including a host computer, a network node and a wireless device for receiving user data from the wireless device at a host computer according to some embodiments of the present disclosure;

FIG. 12 is a flowchart illustrating exemplary methods implemented in a communication system including a host computer, a network node and a wireless device for receiving user data at a host computer according to some embodiments of the present disclosure;

DETAILED DESCRIPTION

Figure 1:
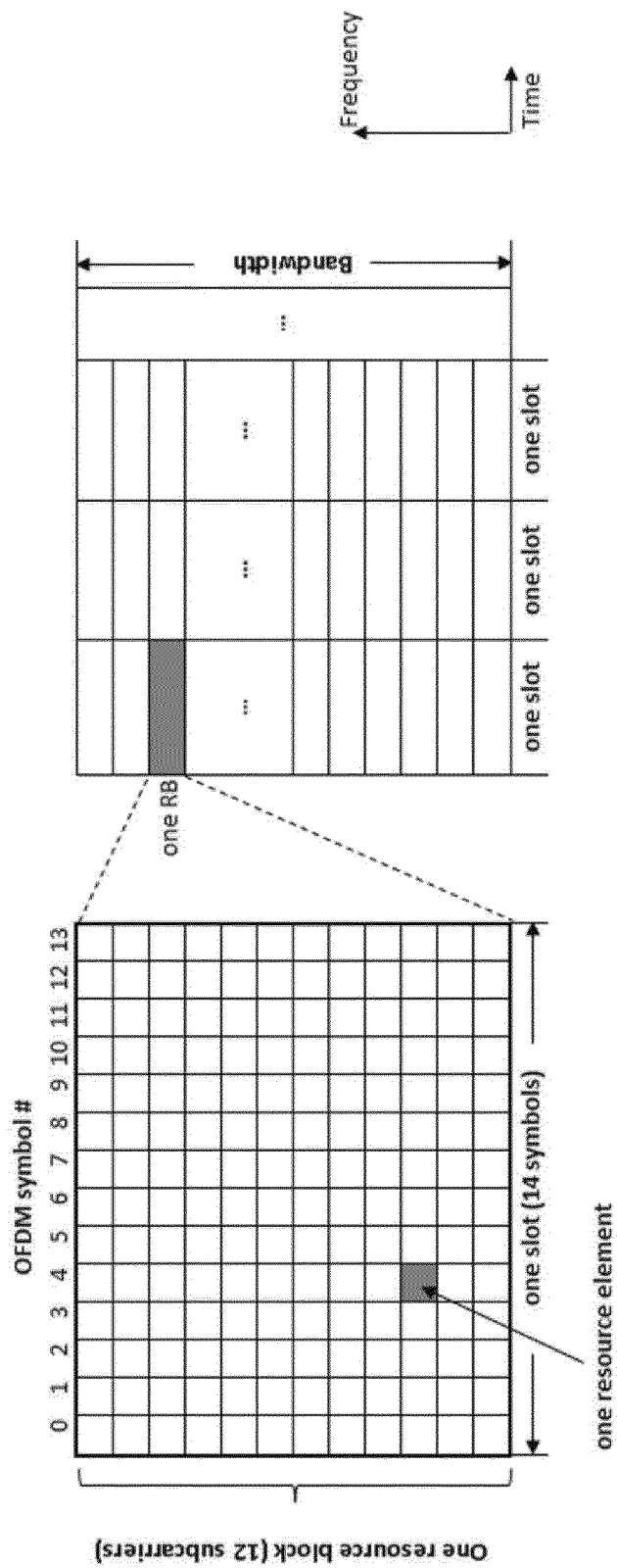
FIG. 1 is a time frequency grid.
Figure 2:
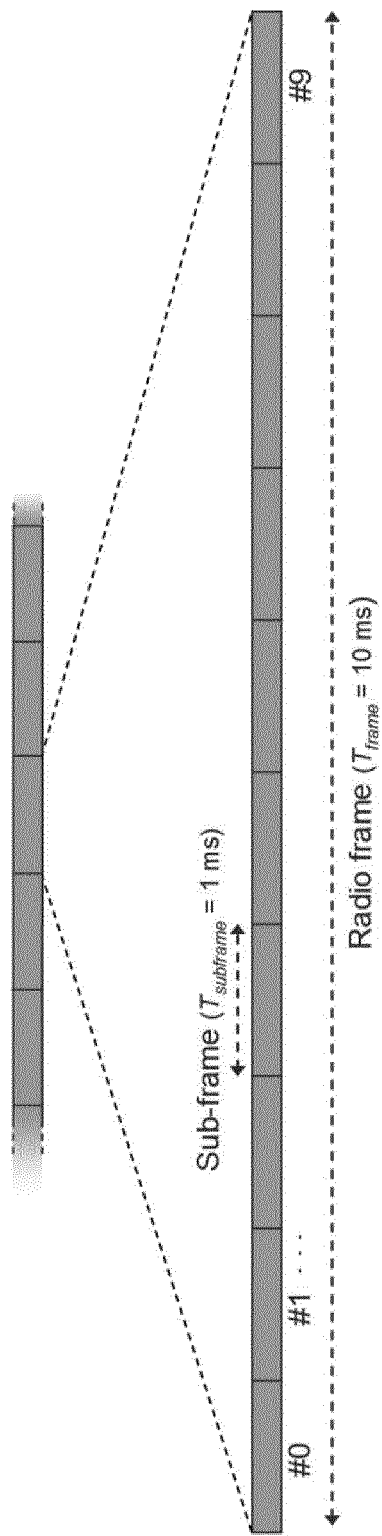
FIG. 2 is a time domain diagram of subframes.
Figure 3:
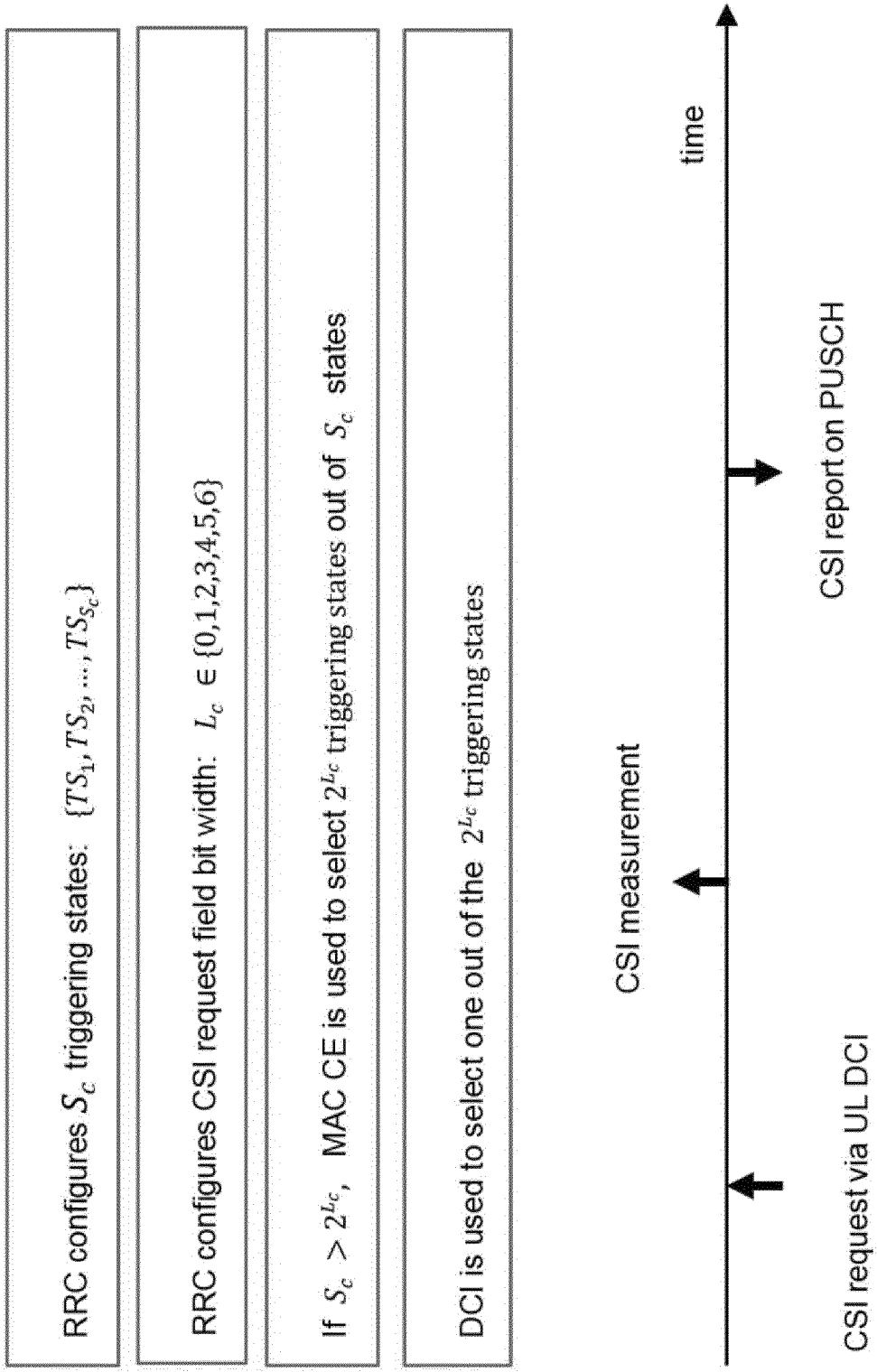
FIG. 3 is an illustration of aperiodic CSI reporting.

As per the below proposals, CSI reporting on PUSCH is supported in NR either multiplexed with UL-SCH or by itself It may be desirable that an NR wireless device is able to transmit CSI without transmitting any other scheduled data. However, in NR, it is not specified how to indicate that a wireless device shall transmit a CSI-only PUSCH without UL-SCH. The same solution as in LTE cannot be used since MCS and RV are encoded as separate fields in NR (and not encoded in a joint field as in LTE). Furthermore, in NR, controlling the modulation order on CSI-only PUSCH shall be supported instead of the fixed quadrature phase shift keying (QPSK) modulation used in LTE.

Proposed functions and/or configurations include:

RAN1 supports aperiodic CSI report on PUSCH, including two cases:
  Case-1: CSI reports multiplexing with uplink data in PUSCH;
  Case-2: CSI reports only in PUSCH (no uplink data);
  Note: how to multiplex UCI with PUSCH is under discussion in certain standards bodies;

For Further Study (FFS): aperiodic CSI report on PUCCH.

Furthermore, modulation order determination for CSI only PUSCH is determined using the same method as when PUSCH also contains UL-SCH data:

Proposed functions and/or configurations:

For aperiodic CSI on PUSCH triggered by an UL grant without UL-SCH data, the modulation order for PUSCH is handled the same way as the case when PUSCH is with UL-SCH data.

Indication of CSI-only PUSCH without UL-SCH data in LTE

In LTE, CSI-only on PUSCH without UL-SCH data is also supported. To indicate that the wireless device shall transmit PUSCH as such, the DCI indicates that $I_{MCS}=29$ (which sets RVid=1 and has a reserved state for modulation order and TB size (TBS)) in conjunction with that the number of PUSCH repetitions is set to N=1 as well as that the CSI request field indicates that a CSI report is triggered. As RV and MCS is jointly encoded in the MCS field, there is no possibility to set an MCS value in case of CSI-only PUSCH in LTE, and quadrature phase shift keying (QPSK) is always used in that case, which is a limitation. This is conveyed by the excerpt from 3GPP TS 36.213 below:

For a non-BL/CE wireless device and for $29 \leq I_{MCS} \leq 31$ the modulation order ($Q_m$) is determined as follows:

if DCI format 0/0A/0B is used and $I_{MCS}=29$ and N=1 (determined by the procedure in Subclause 8.0) or, if DCI format 4 is used and only 1 TB is enabled and $I_{MCS}=29$ for the enabled TB and the signalled number of transmission layers is 1 or if DCI format 4A/4B is used and $I_{MCS}=29$ for both TBs and N=1 (determined by the procedure in Subclause 8.0), and if the "CSI request" bit field is 1 bit and the bit is set to trigger an aperiodic report and, $N_{PRB} \leq 4$ or, the "CSI request" bit field is 2 bits and is triggering an aperiodic CSI report for one serving cell according to one or more wireless communication standards such as, for example, Table 7.2.1-1A (of 3GPP TS 36.213), and $N_{PRB} \leq 4$ or, the "CSI request" bit field is 2 bits and is triggering an aperiodic CSI report for more than one serving cell according to one or more wireless communication standards such as, for example, Table 7.2.1-1A (of 3GPP TS 36.213) and, $N_{PRB} \leq 20$ or, the "CSI request" bit field is 2 bits and is triggering an aperiodic CSI report for one CSI process according to one or more wireless communication standards such as, for example, Table 7.2.1-1B (of 3GPP TS 36.213) and $N_{PRB} \leq 4$ PRB or, the "CSI request" bit field is 2 bits and is triggering an aperiodic CSI report for more than one CSI process according to one or more wireless communication standards such as, for example, Table 7.2.1-1B (of 3GPP TS 36.213) and $N_{PRB} \leq 20$ or, the "CSI request" bit field is 2 bits and is triggering an aperiodic CSI report for one CSI process or {CSI process, CSI subframe set}-pair according to one or more wireless communication standards such as, for example, Table 7.2.1-1C (of 3GPP TS 36.213) and $N_{PRB} \leq 4$ or, the "CSI request" bit field is 2 bits and is triggering an aperiodic CSI report for more than one CSI process and/or {CSI process, CSI subframe set}-pair according to one or more wireless communication standards such as, for example, Table 7.2.1-1C (3GPP TS 36.213) and $N_{PRB} \leq 20$, or the "CSI request" bit field is 3 bits and is triggering an aperiodic CSI report for one CSI process according to one or more wireless communication standards such as, for example, Table 7.2.1-1D or Table 7.2.1-1E or Table 7.2.1-1F or Table 7.2.1-1G (of 3GPP TS 36.213) and $N_{PRB} \leq 4$, or the "CSI request" bit field is 3 bits and is triggering an aperiodic CSI report for 2 to 5 CSI processes according to one or more wireless communication standards such as, for example, Table 7.2.1-1D or Table 7.2.1-1E or Table 7.2.1-1F or Table 7.2.1-1G (of 3GPP TS 36.213) and $N_{PRB} \leq 20$, or the "CSI request" bit field is 3 bits and is triggering an aperiodic CSI report for more than 5 CSI processes according to one or more wireless communication standards such as, for example, Table 7.2.1-1D or Table 7.2.1-1E or Table 7.2.1-1F or Table 7.2.1-1G (of 3GPP TS 36.213), or the "CSI request" bit field in DCI format 0A/0B/4A/4B is set to trigger an aperiodic CSI report, or the "CSI request" bit field is 4 bits and is triggering an aperiodic CSI report for one CSI process according to one or more wireless communication standards such as, for example, Table 7.2.1-1H or Table 7.2.1-1I (of 3GPP TS 36.213) and $N_{PRB} \leq 4$, or the "CSI request" bit field is 4 bits and is triggering an aperiodic CSI report for 2 to 5 CSI processes according to one or more wireless communication standards such as, for example, Table 7.2.1-1H or Table 7.2.1-1I (of 3GPP TS 36.213) and $N_{PRB} \leq 20$, or the "CSI request" bit field is 4 bits and is triggering an aperiodic CSI report for more than 5 CSI processes according to one or more wireless communication standards such as, for example, Table 7.2.1-1H or Table 7.2.1-1I (of 3GPP TS 36.213), or the "CSI request" bit field is 5 bits and is triggering an aperiodic CSI report for one CSI process according to one or more wireless communication standards such as, for example, Table 7.2.1-1J or Table 7.2.1-1K (of 3GPP TS 36.213) and $N_{PRB} \leq 4$, or the "CSI request" bit field is 5 bits and is triggering an aperiodic CSI report for 2 to 5 CSI processes according to one or more wireless communication standards such as, for example, Table 7.2.1-1J or Table 7.2.1-1K (of 3GPP TS 36.213) and $N_{PRB} \leq 20$, or the "CSI request" bit field is 5 bits and is triggering an aperiodic CSI report for more than 5 CSI processes according to one or more wireless communication standards such as, for example, Table 7.2.1-1J or Table 7.2.1-1K (of 3GPP TS 36.213), or the "CSI request" bit field in DCI is set to trigger an aperiodic CSI report and wireless device is configured with higher layer parameter advancedCodebookEnabled, then the modulation order is set to $Q_m = 2$.

| MCS Index $I_{MCS}$ | Modulation Order $Q'_m$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

For a non-BL/CE wireless device and for $29 \leq I_{MCS} \leq 31$, if DCI format 0/0A/0B is used and $I_{MCS} \leq 29$ and N=1 (determined by the procedure in Subclause 8.0) or, if DCI format 4 is used and only 1 TB is enabled and $I_{MCS}=29$ for the enabled TB and the number of transmission layers is 1 or if DCI format 4A/4B is used and $I_{MCS}=29$ for both TBs and N=1 (determined by the procedure in Subclause 8.0), and if the "CSI request" bit field is 1 bit and is set to trigger an aperiodic CSI report and $N_{PRB} \leq 4$ or, the "CSI request" bit field is 2 bits and is triggering an aperiodic CSI report for one serving cell according to one or more wireless communication standards such as, for example, Table 7.2.1-1A (of 3GPP TS 36.213), and, $N_{PRB} \leq 4$ or, the "CSI request" bit field is 2 bits and is triggering aperiodic CSI report for more than one serving cell according to one or more wireless communication standards such as, for example, Table 7.2.1-1A (of 3GPP TS 36.213) and, $N_{PRB} \leq 20$ or, the "CSI request" bit field is 2 bits and is triggering an aperiodic CSI report for one CSI process according to one or more wireless communication standards such as, for example, Table 7.2.1-1B (of 3GPP TS 36.213) and $N_{PRB} \leq 4$ or, the "CSI request" bit field is 2 bits and is triggering an aperiodic CSI report for more than one CSI process according to one or more wireless communication standards such as, for example, Table 7.2.1-1B (of 3GPP TS 36.213) and, $N_{PRB} \leq 20$ or, the "CSI request" bit field is 2 bits and is triggering an aperiodic CSI report for one CSI process or {CSI process, CSI subframe set}-pair according to one or more wireless communication standards such as, for example, Table 7.2.1-1C (of 3GPP TS 36.213) and $N_{PRB} \leq 4$ or, the "CSI request" bit field is 2 bits and is triggering an aperiodic CSI report for more than one CSI process and/or {CSI process, CSI subframe set}-pair according to one or more wireless communication standards such as, for example, Table 7.2.1-1C (of 3GPP TS 36.213) and $N_{PRB} \leq 20$, or the "CSI request" bit field is 3 bits and is triggering an aperiodic CSI report for one CSI process according to one or more wireless communication standards such as, for example, Table 7.2.1-1D or Table 7.2.1-1E or Table 7.2.1-1F or Table 7.2.1-1G (of 3GPP TS 36.213) and $N_{PRB} \leq 4$, or the "CSI request" bit field is 3 bits and is triggering an aperiodic CSI report for 2 to 5 CSI processes according to one or more wireless communication standards such as, for example, Table 7.2.1-1D or Table 7.2.1-1E or Table 7.2.1-1F or Table 7.2.1-1G (of 3GPP TS 36.213) and $N_{PRB} \leq 20$, or the "CSI request" bit field is 3 bits and is triggering an aperiodic CSI report for more than 5 CSI processes according to one or more wireless communication standards such as, for example, Table 7.2.1-1D or Table 7.2.1-1E or Table 7.2.1-1F or Table 7.2.1-1G (of 3GPP TS 36.213), or the "CSI request" bit field in DCI format 0A/0B/4A/4B is set to trigger an aperiodic CSI report, or the "CSI request" bit field is 4 bits and is triggering an aperiodic CSI report for one CSI process according to one or more wireless communication standards such as, for example, Table 7.2.1-1H or Table 7.2.1-1I (of 3GPP TS 36.213) and $N_{PRB} \leq 4$, or the "CSI request" bit field is 4 bits and is triggering an aperiodic CSI report for 2 to 5 CSI processes according to one or more wireless communication standards such as, for example, Table 7.2.1-1H or Table 7.2.1-1I (of 3GPP TS 36.213) and $N_{PRB} \leq 20$, or the "CSI request" bit field is 4 bits and is triggering an aperiodic CSI report for more than 5 CSI processes according to one or more wireless communication standards such as, for example, Table 7.2.1-1H or Table 7.2.1-1I (of 3GPP TS 36.213), or the "CSI request" bit field is 5 bits and is triggering an aperiodic CSI report for one CSI process according to one or more wireless communication standards such as, for example, Table 7.2.1-1J or Table 7.2.1-1K (of 3GPP TS 36.213) and $N_{PRB} \leq 4$, or the "CSI request" bit field is 5 bits and is triggering an aperiodic CSI report for 2 to 5 CSI processes according to one or more wireless communication standards such as, for example, Table 7.2.1-1J or Table 7.2.1-1K (of 3GPP TS 36.213) and $N_{PRB} \leq 20$, or the "CSI request" bit field is 5 bits and is triggering an aperiodic CSI report for more than 5 CSI processes according to one or more wireless communication standards such as, for example, Table 7.2.1-1J or Table 7.2.1-1K (of 3GPP TS 36.213), or the "CSI request" bit field in DCI is set to trigger an aperiodic CSI report and wireless device is configured with higher layer parameter advancedCodebookEnabled, then there is no transport block for the UL-SCH and only the control information feedback for the current PUSCH reporting mode is transmitted by the wireless device.

Before describing in detail exemplary embodiments, it is noted that the embodiments reside primarily in combinations of apparatus components and processing steps related to indicating channel state information (CSI)-only physical uplink shared channel (PUSCH) without an uplink shared channel (UL-SCH). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device such as a wireless device or a radio network node.

In some embodiments, the non-limiting terms wireless device or a user equipment (UE) are used interchangeably. The wireless device herein can be any type of wireless device capable of communicating with a network node or another wireless device over radio signals, such as wireless device. The wireless device may also be a radio communication device, target device, device to device (D2D) wireless device, machine type wireless device or wireless device capable of machine to machine communication (M2M), low-cost and/or low-complexity wireless device, a sensor equipped with wireless device, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE, may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In proposed embodiments, the wireless device determines, upon receiving an uplink-related DCI carrying an uplink grant, such as NR DCI Format 0_1, that a PUSCH shall be transmitted comprising uplink control information UCI (comprising CSI) without comprising an uplink transport channel (such as UL-SCH, comprising wireless device data) based on a number of information fields in the DCI being set to certain specific values.

Figure 4:
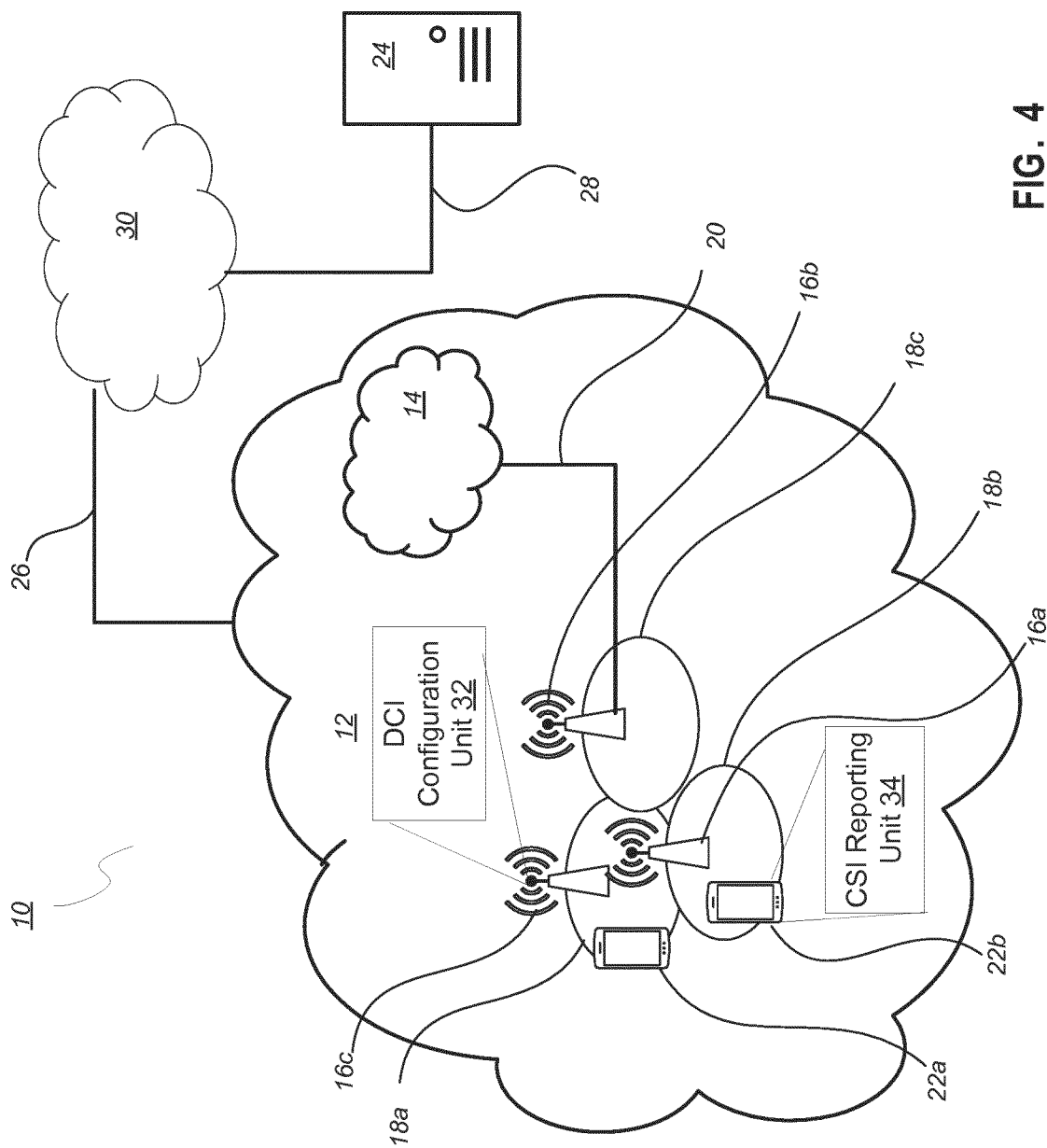
FIG. 4 is a schematic diagram of an exemplary network architecture illustrating a communication system connected via an intermediate network to a host computer according to the principles in the present disclosure.

Returning to the drawing figures, in which like elements are referred to by like reference numerals, there is shown in FIG. 4 a schematic diagram of a communication system, according to an embodiment, including a communication system 10, such as a 3GPP-type cellular network, which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device 22a located in coverage area 18a is configured to wirelessly connect to, or be paged by, the corresponding network node 16c. A second wireless device 22b in coverage area 18b is wirelessly connectable to the corresponding network node 16a. While a plurality of wireless devices 22a, 22b (collectively referred to as wireless devices 22) are illustrated in this example, the disclosed embodiments are equally applicable to a situation where a sole wireless device is in the coverage area or where a sole wireless device is connecting to the corresponding network node 16. Note that although only two wireless devices 22 and three network nodes 16 are shown for convenience, the communication system may include many more wireless devices 22 and network nodes 16.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 4 as a whole enables connectivity between one of the connected wireless devices 22a, 22b and the host computer 24. The connectivity may be described as an over-the-top (OTT) connection. The host computer 24 and the connected wireless devices 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected wireless device 22a. Similarly, the network node 16 need not be aware of the future routing of an outgoing uplink communication originating from the wireless device 22a towards the host computer 24.

A network node 16 is configured to include a downlink control information (DCI) configuration unit 32 which is configured to indicate in the downlink control information, channel state information, CSI, —only physical uplink shared channels, PUSCH, without uplink shared channels, UL-SCH. A wireless device 22 is configured to include a CSI reporting unit 34 which is configured to detect if channel state information, CSI, —only physical uplink shared channels, PUSCH, without uplink shared channels, UL-SCH, have been selected by a network node 16.

Example implementations, in accordance with an embodiment, of the wireless device 22, network node 16 and host computer 24 discussed in the preceding paragraphs will now be described with reference to FIG. 5. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to a traditional processor and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a wireless device 22 connecting via an OTT connection 52 terminating at the wireless device 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and comprising hardware 58 enabling it to communicate with the host computer 24 and with the wireless device 22. The hardware 58 may include a communication interface 60 for setting up and maintaining a wired or wireless connection with an interface of a different communication device of the communication system 10, as well as a radio interface 62 for setting up and maintaining at least a wireless connection 64 with a wireless device 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to a traditional processor and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 is configured to include a downlink control information (DCI) configuration unit 32 which is configured to indicate in the downlink control information, channel state information, CSI, —only physical uplink shared channels, PUSCH, without uplink shared channels, UL-SCH.

The communication system 10 further includes the wireless device 22 already referred to. The wireless device 22 may have hardware 80 that may include a radio interface 82 configured to set up and maintain a wireless connection 64 with a network node 16 serving a coverage area 18 in which the wireless device 22 is currently located. The radio interface 82 may be formed as or may include, for example, one or more RF transmitters, one or more RF receivers, and/or one or more RF transceivers.

The hardware 80 of the wireless device 22 further includes processing circuitry 84. The processing circuitry 84 may include a processor 86 and memory 88. In particular, in addition to a traditional processor and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the wireless device 22 may further comprise software 90, which is stored in, for example, memory 88 at the wireless device 22, or stored in external memory (e.g., database) accessible by the wireless device 22. The software 90 may be executable by the processing circuitry 84. The software 90 may include a client application 92. The client application 92 may be operable to provide a service to a human or non-human user via the wireless device 22, with the support of the host computer 24. In the host computer 24, an executing host application 50 may communicate with the executing client application 92 via the OTT connection 52 terminating at the wireless device 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by wireless device 22. The processor 86 corresponds to one or more processors 86 for performing wireless device 22 functions described herein. The wireless device 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to wireless device 22. For example, the processing circuitry 84 of the wireless device 22 may include a CSI reporting unit 34 which is configured to detect if channel state information, CSI, —only physical uplink shared channels, PUSCH, without uplink shared channels, UL-SCH, have been selected by a network node 16.

Figure 5:
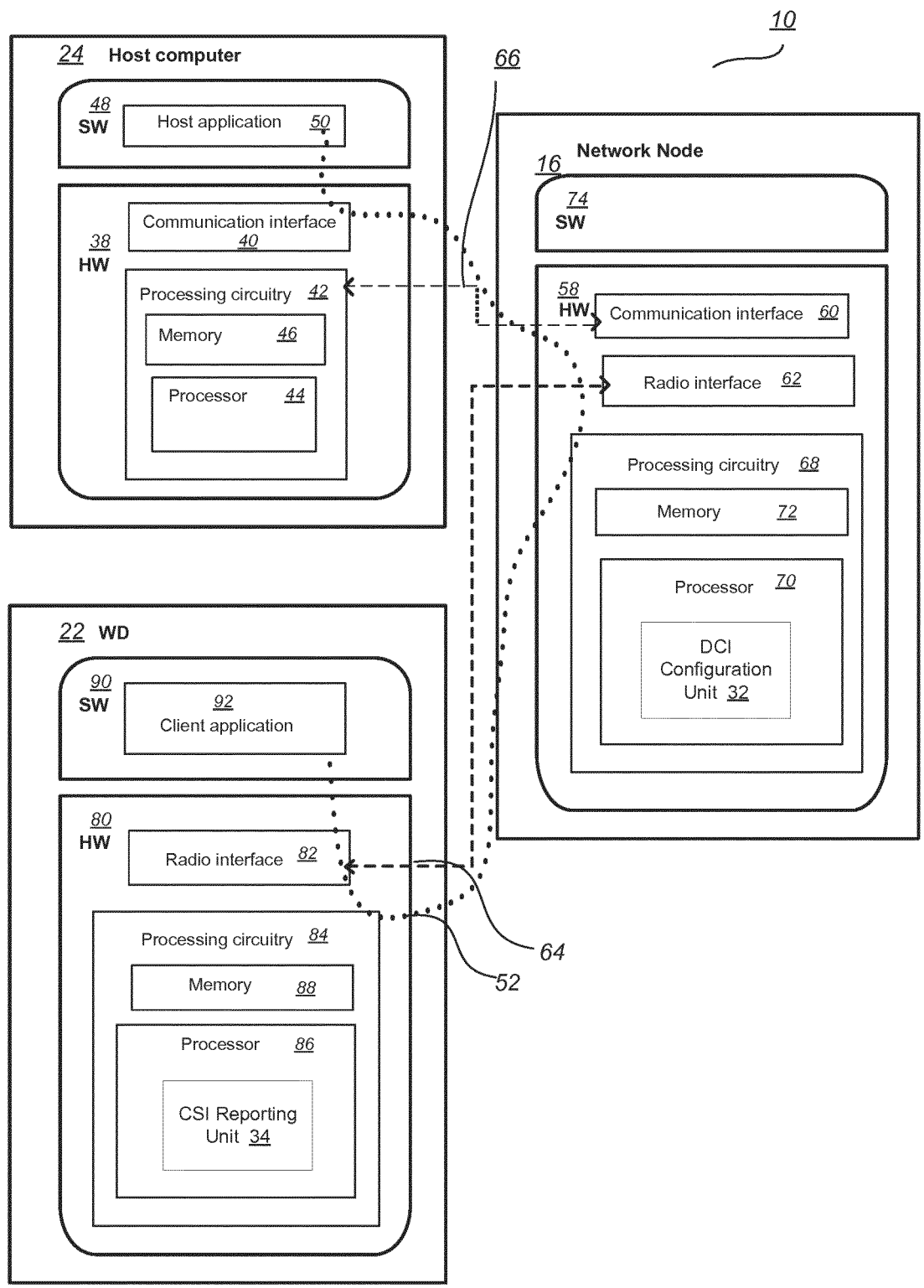
FIG. 5 is a block diagram of a host computer communicating via a network node with a wireless device over an at least partially wireless connection according to some embodiments of the present disclosure.

In some embodiments, the inner workings of the network node 16, wireless device 22, and host computer 24 may be as shown in FIG. 5 and independently, the surrounding network topology may be that of FIG. 4.

In FIG. 5, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the wireless device 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the wireless device 22 and the network node 16 is in accordance with the teachings of the embodiments described throughout this disclosure. One or more of the various embodiments improve the performance of OTT services provided to the wireless device 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and wireless device 22, in response to variations in the measurement results. The measurement procedure and/or the network functionality for reconfiguring the OTT connection 52 may be implemented in the software 48 of the host computer 24 or in the software 90 of the wireless device 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary wireless device signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Although FIGS. 4 and 5 show various "units" such as DCI configuration unit 32, and CSI reporting unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 6:
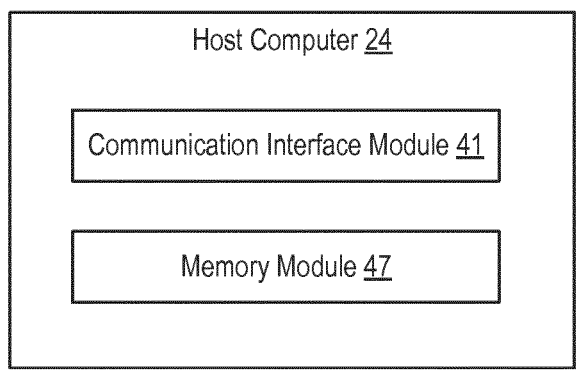
FIG. 6 is a block diagram of an alternative embodiment of a host computer according to some embodiments of the present disclosure.

FIG. 6 is a block diagram of an alternative host computer 24, which may be implemented at least in part by software modules containing software executable by a processor to perform the functions described herein. The host computer 24 includes a communication interface module 41 configured to set up and maintain a wired or wireless connection with an interface of a different communication device of the communication system 10. The memory module 47 is configured to store data, programmatic software code and/or other information described herein.

Figure 7:
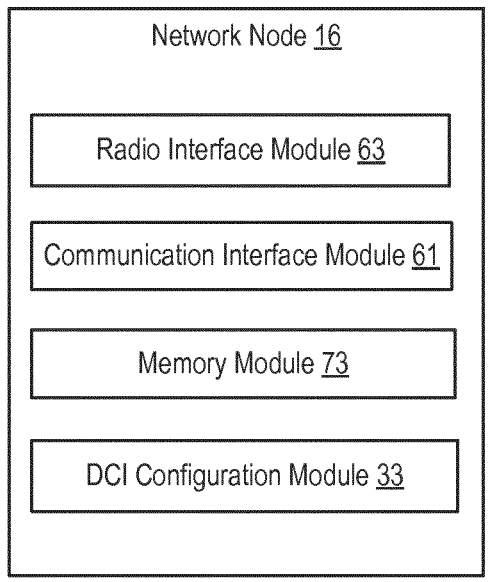
FIG. 7 is a block diagram of an alternative embodiment of a network node according to some embodiments of the present disclosure.

FIG. 7 is a block diagram of an alternative network node 16, which may be implemented at least in part by software modules containing software executable by a processor to perform the functions described herein. The network node 16 includes a radio interface module 63 configured for setting up and maintaining at least a wireless connection 64 with a wireless device 22 located in a coverage area 18 served by the network node 16. The network node 16 also includes a communication interface module 61 configured for setting up and maintaining a wired or wireless connection with an interface of a different communication device of the communication system 10. The communication interface module 61 may also be configured to facilitate a connection 66 to the host computer 24. The memory module 73 that is configured to store data, programmatic software code and/or other information described herein. The DCI configuration module 33 is configured to indicate in the downlink control information, channel state information, CSI, —only physical uplink shared channels, PUSCH, without uplink shared channels, UL-SCH, i.e., PUSCH without associated shared channel data.

Figure 8:
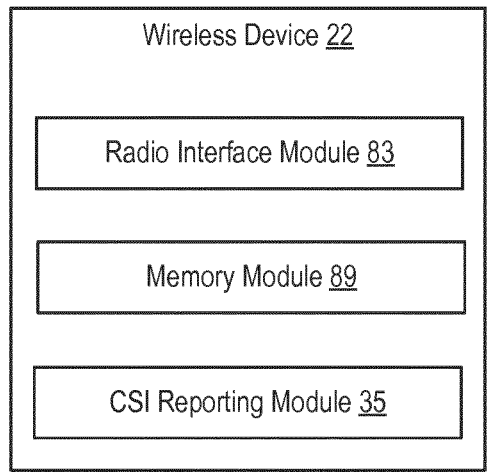
FIG. 8 is a block diagram of an alternative embodiment of a wireless device according to some embodiments of the present disclosure.

FIG. 8 is a block diagram of an alternative wireless device 22, which may be implemented at least in part by software modules containing software executable by a processor to perform the functions described herein. The wireless device 22 includes a radio interface module 83 configured to set up and maintain a wireless connection 64 with a network node 16 serving a coverage area 18 in which the wireless device 22 is currently located. The memory module 89 is configured to store data, programmatic software code and/or other information described herein. The CSI reporting module 35 is configured to detect if channel state information, CSI, —only physical uplink shared channels, PUSCH, without uplink shared channels, UL-SCH, have been selected by a network node 16.

Figures 9, 10:
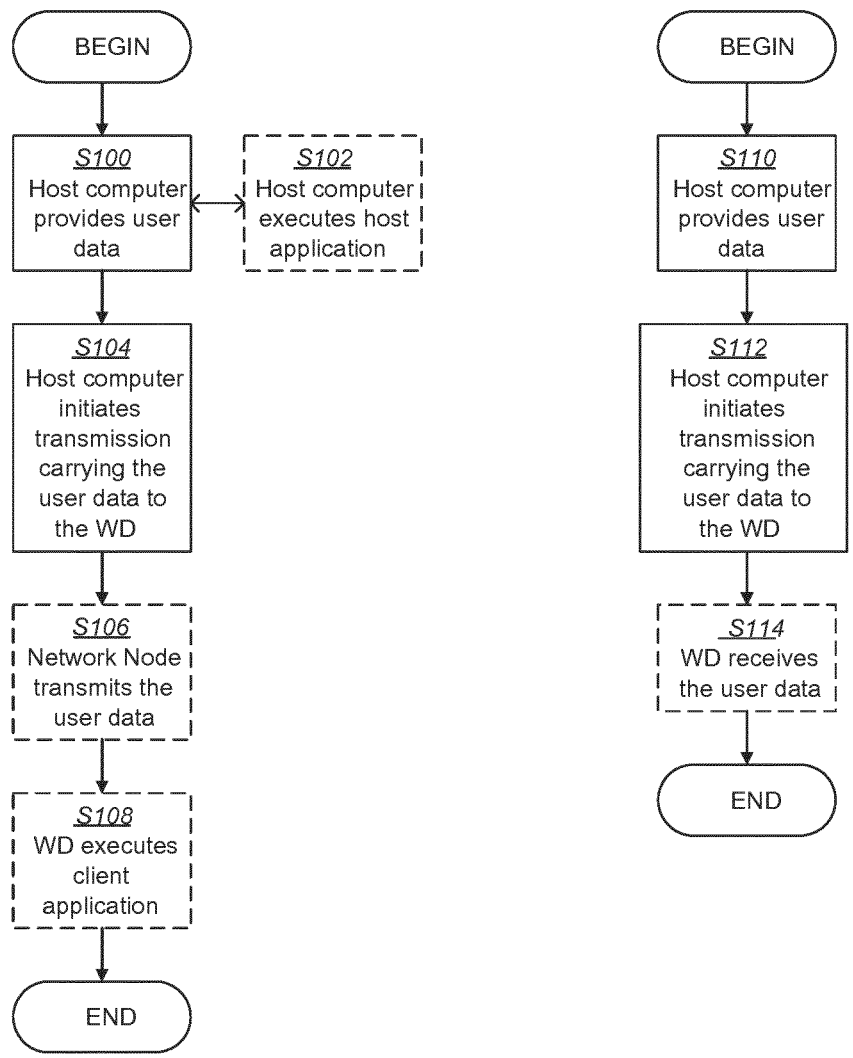
FIG. 9 is a flowchart illustrating exemplary methods implemented in a communication system including a host computer, a network node and a wireless device for executing a client application at a wireless device according to some embodiments of the present disclosure.
FIG. 10 is a flowchart illustrating exemplary methods implemented in a communication system including a host computer, a network node and a wireless device for receiving user data at a wireless device according to some embodiments of the present disclosure.

FIG. 9 is a flowchart illustrating an exemplary method implemented in a communication system, such as, for example, the communication system of FIGS. 4 and 5, in accordance with one embodiment. The communication system may include a host computer 24, a network node 16 and a wireless device 22, which may be those described with reference to FIG. 5. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the wireless device 22 (Block S104). In an optional third step, the network node 16 transmits to the wireless device 22 the user data which was carried in the transmission that the host computer 24 initiated, in accordance with the teachings of the embodiments described throughout this disclosure (Block S106). In an optional fourth step, the wireless device 22 executes a client application, such as, for example, the client application 114, associated with the host application 50 executed by the host computer 24 (Block S108).

FIG. 10 is a flowchart illustrating an exemplary method implemented in a communication system, such as, for example, the communication system of FIG. 4, in accordance with one embodiment. The communication system may include a host computer 24, a network node 16 and a wireless device 22, which may be those described with reference to FIGS. 4 and 5. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the wireless device 22 (Block S112). The transmission may pass via the network node 16, in accordance with the teachings of the embodiments described throughout this disclosure. In an optional third step, the wireless device 22 receives the user data carried in the transmission (Block S114).

FIG. 11 is a flowchart illustrating an exemplary method implemented in a communication system, such as, for example, the communication system of FIG. 4, in accordance with one embodiment. The communication system may include a host computer 24, a network node 16 and a wireless device 22, which may be those described with reference to FIGS. 4 and 5. In an optional first step of the method, the wireless device 22 receives input data provided by the host computer 24 (Block S116). In an optional substep of the first step, the wireless device 22 executes the client application 114, which provides the user data in reaction to the received input data provided by the host computer 24 (Block S118). Additionally or alternatively, in an optional second step, the wireless device 22 provides user data (Block S120). In an optional substep of the second step, the wireless device 22 provides the user data by executing a client application, such as, for example, client application 114 (Block S122). In providing the user data, the executed client application 114 may further consider user input received from the user. Regardless of the specific manner in which the user data was provided, the wireless device 22 may initiate, in an optional third substep, transmission of the user data to the host computer 24 (Block S124). In a fourth step of the method, the host computer 24 receives the user data transmitted from the wireless device 22, in accordance with the teachings of the embodiments described throughout this disclosure (Block S126).

FIG. 12 is a flowchart illustrating an exemplary method implemented in a communication system, such as, for example, the communication system of FIG. 4, in accordance with one embodiment. The communication system may include a host computer 24, a network node 16 and a wireless device 22, which may be those described with reference to FIGS. 4 and 5. In an optional first step of the method, in accordance with the teachings of the embodiments described throughout this disclosure, the network node 16 receives user data from the wireless device 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 13:
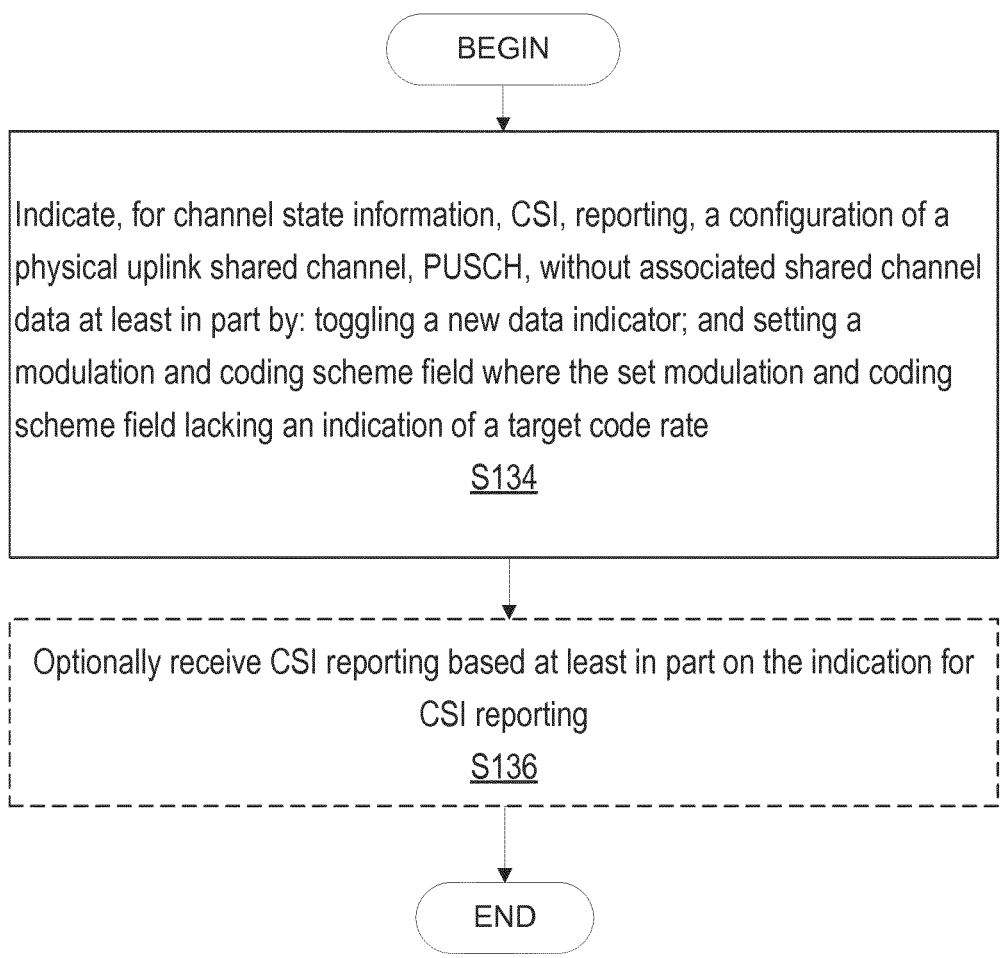
FIG. 13 is a flowchart of an exemplary process in a network node according to some embodiments the present disclosure.

FIG. 13 is a flowchart of an exemplary process in a network node according to the principles of the disclosure. One or more Blocks and/or functions performed by network node 16 may be performed by one or more elements of network node 16 such as by DCI configuration unit 32 in processing circuitry 68, processor 70, radio interface 62, etc. In one or more embodiments, network node 16 such as via one or more of processing circuitry 68, processor 70 and radio interface 62 is configured to indicate (Block S134), for channel state information, CSI, reporting, a configuration of a physical uplink shared channel, PUSCH, without associated shared channel data at least in part by: toggling a new data indicator, and setting a modulation and coding scheme field, the set modulation and coding scheme field lacking an indication of a target code rate. In one or more embodiments, network node 16 such as via one or more of processing circuitry 68, processor 70 and radio interface 62 is configured to optionally receive (Block S136) CSI reporting based at least in part on the indication.

In one or more embodiments, a method for indicating CSI reporting without associated shared channel data is provided. The method includes toggling a new data indicator, setting a modulation and coding scheme field where the set modulation and coding scheme field lacking an indication of a target code rate, and indicating the toggling of the new data indicator and the set modulation and coding scheme field to a wireless device. In one or more embodiments, this method is performed by the network node 16 as discussed herein.

In one or more embodiments, the processing circuitry 68 is further configured to set a CSI request field to trigger CSI reporting as part of the indication, for CSI reporting, of the configuration of the PUSCH without the associated shared channel data. In one or more embodiments, the CSI request field is set to include at least one non-zero value. In one or more embodiments, the processing circuitry 68 is further configured to set a redundancy version field to a non-zero value as part of the indication, for CSI reporting, of the configuration of the PUSCH without the associated shared channel data.

In one or more embodiments, the redundancy version field is set to 1. In one or more embodiments, the new data indicator and the modulation and coding scheme field are included in downlink control information, DCI. In one or more embodiments, the indication, for CSI reporting, of the configuration of the PUSCH without the associated shared channel data is indicated in downlink control information, DCI, that is configured to omit an indication of a transport block size for the shared channel data.

In one or more embodiments, the process includes indicating, via the DCI configuration unit 32, channel state information, CSI, —only physical uplink shared channels, PUSCH, without uplink shared channels, UL-SCH, by: toggling a new data indicator; setting a modulation and coding scheme field to a reserved state not indicating a target code rate; and triggering CSI reporting by setting a CSI request field not equal to zero.

Figure 14:
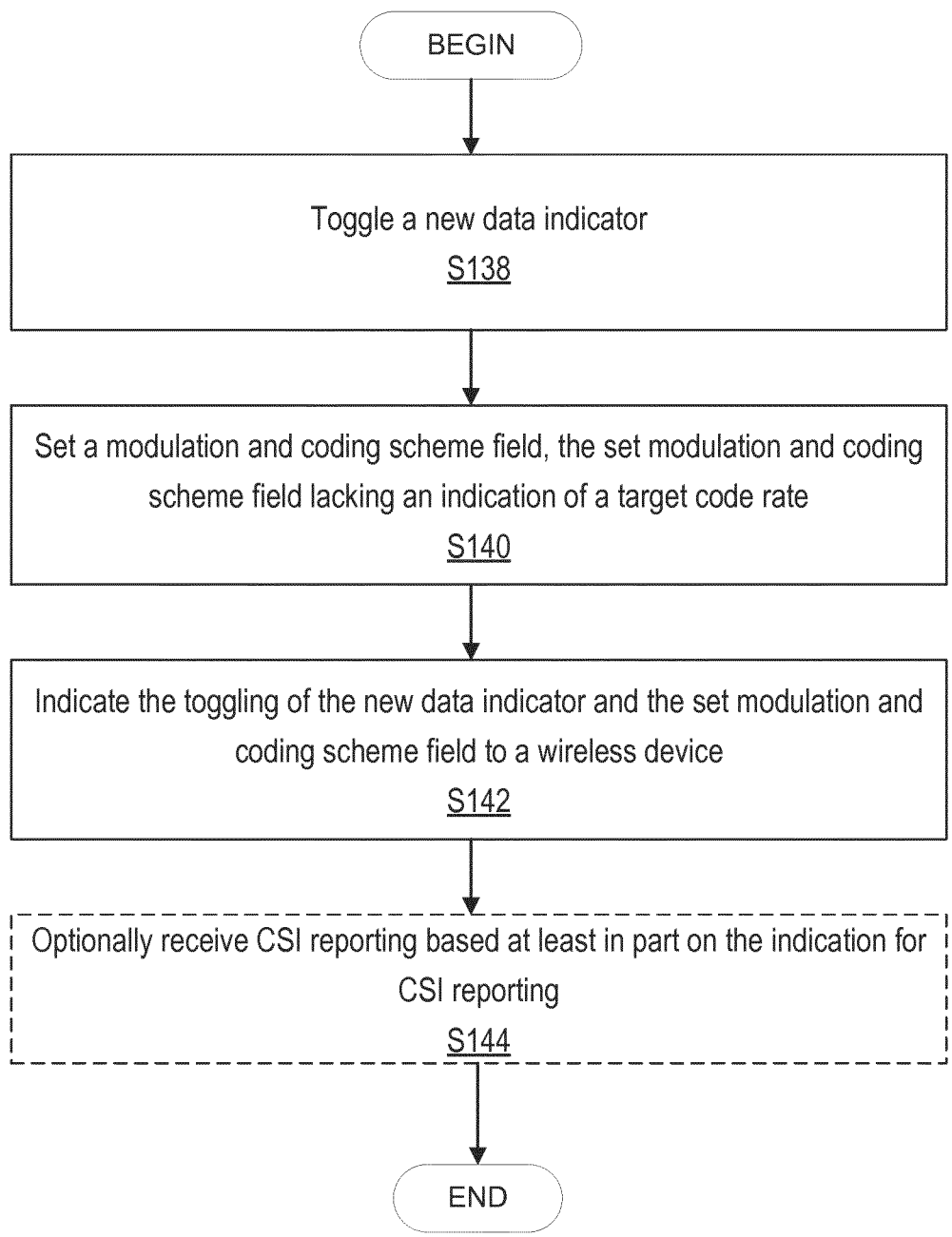
FIG. 14 is a flowchart of another exemplary process in a network node according to some embodiments the present disclosure.

FIG. 14 is a flowchart of another exemplary process in a network node 16 according to the principles of the disclosure. One or more Blocks and/or functions performed by network node 16 may be performed by one or more elements of network node 16 such as by DCI configuration unit 32 in processing circuitry 68, processor 70, radio interface 62, etc. In one or more embodiments, network node 16 such as via one or more of processing circuitry 68, processor 70 and radio interface 62 is configured to toggle (S138) a new data indicator, as described herein. In one or more embodiments, network node 16 such as via one or more of processing circuitry 68, processor 70 and radio interface 62 is configured to set (S140) a modulation and coding scheme field where the set modulation and coding scheme field lacks an indication of a target code rate. In one or more embodiments, network node 16 such as via one or more of processing circuitry 68, processor 70 and radio interface 62 is configured to indicate (S142) the toggling of the new data indicator and the set modulation and coding scheme field to the wireless device 22. In one or more embodiments, network node 16 such as via one or more of processing circuitry 68, processor 70 and radio interface 62 is configured to optionally receive (S144) CSI reporting based at least in part on the indication.

According to one or more embodiments, the processing circuitry 68 is further configured to set a CSI request field to trigger CSI reporting as part of the indication, for CSI reporting, of the configuration of the PUSCH without the associated shared channel data. According to one or more embodiments, the CSI request field is set to include at least one non-zero value. According to one or more embodiments, the processing circuitry 68 is further configured to set a redundancy version field to a predefined value as part of the indication, for CSI reporting, of the configuration of the PUSCH without the associated shared channel data.

According to one or more embodiments, the redundancy version field is set to 1. According to one or more embodiments, the new data indicator and the modulation and coding scheme field are included in downlink control information, DCI. According to one or more embodiments, the indication, for CSI reporting, of the configuration of the PUSCH without the associated shared channel data is indicated in downlink control information, DCI, that is configured to omit an indication of a transport block size for the shared channel data.

Figure 15:
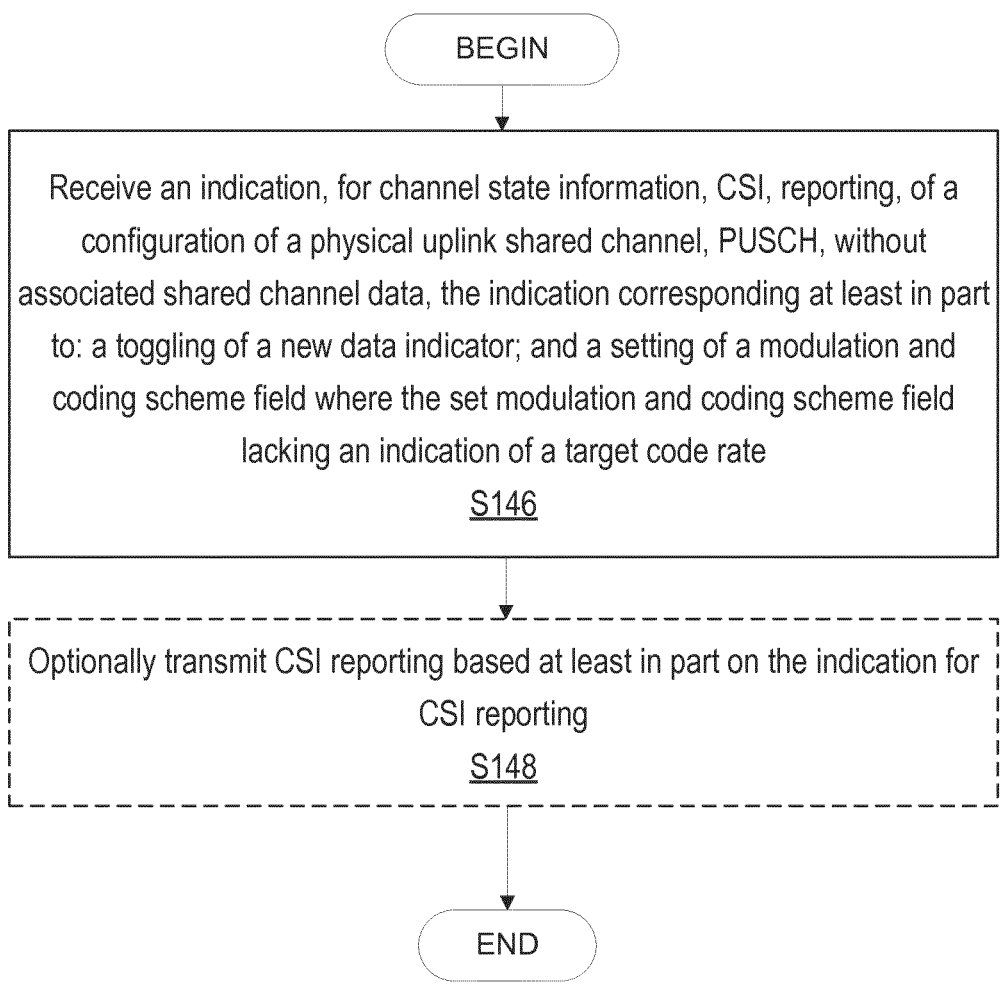
FIG. 15 is a flowchart of an exemplary process in a wireless device according to some embodiments of the present disclosure.

FIG. 15 is a flowchart of an exemplary process in a wireless device according to the principles of the disclosure. One or more Blocks and/or functions performed by wireless device 22 may be performed by one or more elements of wireless device 22 such as by CSI reporting unit 34 in processing circuitry 84, processor 86, radio interface 82, etc. In one or more embodiments, wireless device 22 such as via one or more of processing circuitry 84, processor 86 and radio interface 82 is configured to receive (Block S146) an indication, for channel state information, CSI, reporting, of a configuration of a physical uplink shared channel, PUSCH, without associated shared channel data where the indication corresponds at least in part to: a toggling of a new data indicator, and a setting of a modulation and coding scheme field, the set modulation and coding scheme field lacking an indication of a target code rate. In one or more embodiments, wireless device 22 such as via one or more of processing circuitry 84, processor 86 and radio interface 82 is configured to optionally transmit (Block S148) CSI reporting based at least in part on the indication for CSI reporting.

In one or more embodiment, the indication further corresponds to a setting of a CSI request field to trigger CSI reporting. In one or more embodiments, the CSI request field is set to include at least one non-zero value. In one or more embodiments, the indication further corresponds to a setting of a redundancy version field to a non-zero value as part of the indication, for CSI reporting, of the configuration of the PUSCH without the associated shared channel data. In one or more embodiments, the redundancy version field is set to 1. In one or more embodiments, the new data indicator and the modulation and coding scheme field are included in downlink control information, DCI. In one or more embodiments, wherein the indication is indicated in downlink control information, DCI, that is configured to omit an indication of a transport block size for the shared channel data.

In one or more embodiments, the process performed by the wireless device 22 includes detecting, via the CSI reporting unit 34, if channel state information, CSI, —only physical uplink shared channels, PUSCH, without uplink shared channels, UL-SCH, have been selected by a network node by detecting: a toggling of a new data indicator; a setting of a modulation and coding scheme field to a reserved state not indicating a target code rate; and a setting of a CSI request field being not equal to zero.

Figure 16:
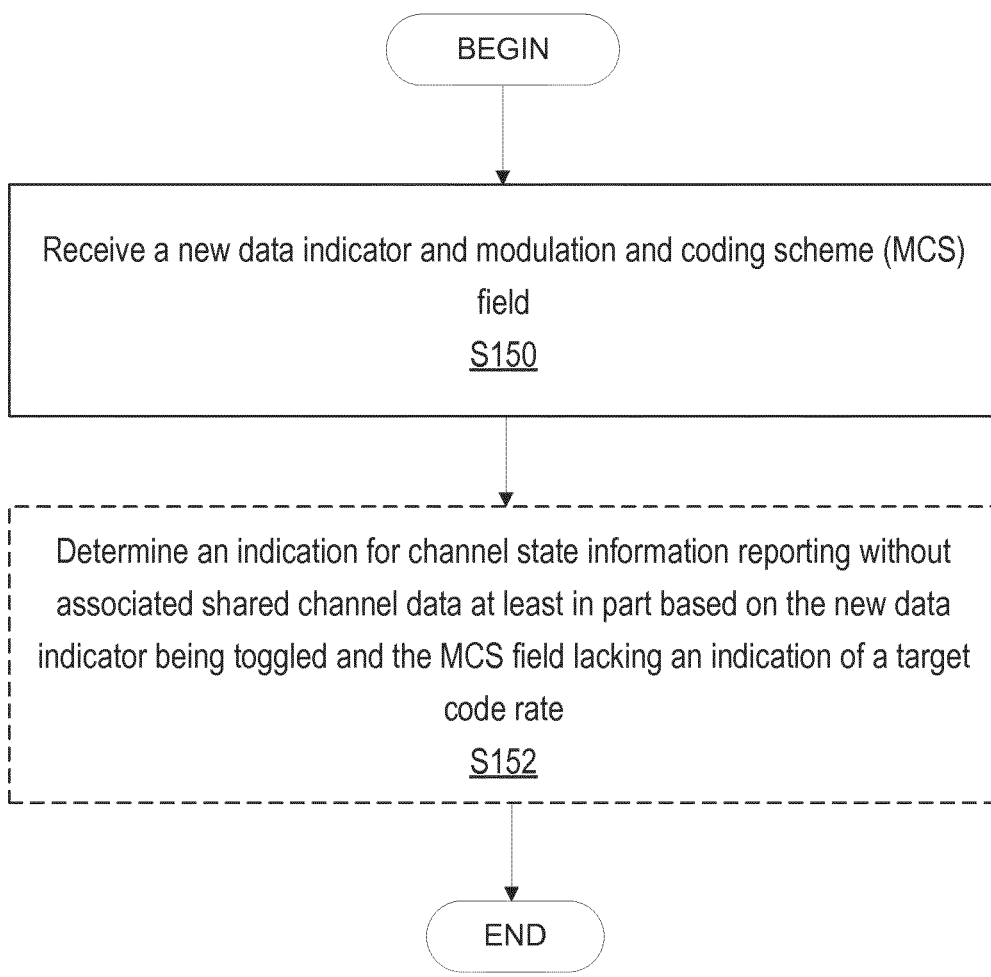
FIG. 16 is a flowchart of an exemplary process in a wireless device according to some embodiments of the present disclosure.

FIG. 16 is a flowchart of an exemplary process in a wireless device according to the principles of the disclosure. One or more Blocks and/or functions performed by wireless device 22 may be performed by one or more elements of wireless device 22 such as by CSI reporting unit 34 in processing circuitry 84, processor 86, radio interface 82, etc. In one or more embodiments, wireless device 22 such as via one or more of processing circuitry 84, processor 86 and radio interface 82 is configured to receive (Block S150) a new data indicator and modulation and coding scheme (MCS) field, as described herein. In one or more embodiments, wireless device 22 such as via one or more of processing circuitry 84, processor 86 and radio interface 82 is configured to determine (Block S152) an indication for channel state information reporting without associated shared channel data at least in part based on the new data indicator being toggled and the MCS field lacking an indication of a target code rate. In one or more embodiments, wireless device 22 such as via one or more of processing circuitry 84, processor 86 and radio interface 82 is configured to optionally transmit (Block S148) CSI reporting based at least in part on the indication for CSI reporting.

According to one or more embodiments, the indication further corresponds to a setting of a CSI request field to trigger CSI reporting. According to one or more embodiments, the CSI request field is set to include at least one non-zero value. According to one or more embodiments, the indication further corresponds to a setting of a redundancy version field to a non-zero value as part of the indication, for CSI reporting, of the configuration of the PUSCH without the associated shared channel data.

According to one or more embodiments, the redundancy version field is set to 1. According to one or more embodiments, the new data indicator and the modulation and coding scheme field are included in downlink control information, DCI. According to one or more embodiments, the indication is indicated in downlink control information, DCI, that is configured to omit an indication of a transport block size for the shared channel data. According to one or more embodiments, CSI reporting is optionally transmitted based at least in part on the indication.

Further details associated with the indication of a PUSCH without associated shared channel data, which is also referred to as "CSI-only PUSCH" and "CSI-only PUSCH without UL-SCH" herein, are as follows.

In some embodiments, the criterion that the PUSCH is a "CSI-only PUSCH" includes that the UL-related DCI comprises a CSI request field, and that the CSI request field does not indicate "No CSI report". This is typically achieved by setting the CSI request field to include at least one non-zero, (e.g., '0001' if the CSI request field is configured to contain 4 bits). In one example assuming a two bit CSI request field, "00" corresponds to no CSI requested, "01"-"11" corresponds to request CSI according to CSI configuration such that the CSI request field being set to include at least one non-zero value corresponds to any one of "01"-"11". This may occur since there must be a CSI report triggered for the PUSCH to carry CSI. However, in an alternative embodiment, the network node knows that a CSI report on physical uplink control channel (PUCCH) is configured to occur in a slot and may schedule a CSI only PUSCH without any triggered CSI report. In that case, the PUCCH-based report may be piggybacked on the PUSCH instead of being transmitted on PUCCH, and it may not be necessary to also trigger an aperiodic CSI report to have a CSI only PUSCH transmission.

In further embodiments, the criterion for determining that the PUSCH is a "CSI only PUSCH" comprises that the MCS field is set to a reserved state which only selects modulation order but not a target code rate (which normally implicitly determines the transport block size of a scheduled transport block of UL-SCH), i.e., the set MCS lacks an indication of a target code rate which is needed to calculate a TBS. In one or more embodiments, setting the MCS field to a reserved state corresponds to indicating that no target MCS is provided by the MCS field or indicating no change to the MCS.

This may be done by indicating $28<=I_{MCS}<=31$ in the NR 64QAM MCS table, where the different entries indicate different modulation orders between pi/2-BPSK, QPSK, 16QAM and 64QAM. As no transport block (TB) would be transmitted in a CSI only PUSCH since UL-SCH is not transmitted, there is no need to indicate a TB size whereby setting the field in such a way may distinguish a DCI scheduling CSI only PUSCH from a PUSCH comprising also UL-SCH. The payload size of the CSI report is known from the type of CSI configured for reporting (although the CSI payload may depend additionally on which values the wireless device 22 selects for certain CSI parameters such as RI and CRI, but that payload ambiguity is rather small and is resolved by splitting the CSI payload into two parts, a CSI Part 1 and a CSI Part 2 where the payload of CSI Part1 1 is fixed and the payload of CSI Part 2 is determined from the content of CSI Part 1, which is decoded before decoding CSI Part 2).

However, typically reserved states of the MCS field are used for indicating retransmission of a TB on PUSCH (i.e. the PUSCH comprises UL-SCH data in those cases), so just setting the MCS field to a reserved state, in one or more embodiments, may not be enough to distinguish CSI-only PUSCH from PUSCH comprising also UL-SCH data. Therefore, in further embodiments, the criterion for determining that the PUSCH is a "CSI only PUSCH" additionally comprises toggling the New Data Indicator (NDI), i.e., value of NDI field, and setting the redundancy version index, RVid, to a value not equal to zero. This is because the NDI bit typically is toggled (and the RVid is typically set to 0 but not necessarily) to indicate an initial transmission of a TB of UL-SCH data. Toggling the NDI bit and setting the RVid to another value, such as 1, 2 or 3, would be an unlikely setting for indicating a transmission of PUSCH on UL-SCH. In other words, the NDI is toggled with no MCS value which is not a known combination for UL-SCH data since no new MCS value is only used for retransmission and not new data. In one or more embodiments, the toggling of the NDI occurs over two DCI transmission such that the NDI toggles in value, for example, between the first DCI transmission and second DCI transmission. In one or more embodiments, setting the MCS field to a predefined value lacking an indication of a target code rate corresponds to setting the MCS field to an MCS index (which is an example of a predefined value) corresponding to a reserve state.

Since an initial transmission of a TB of UL-SCH would need to specify the TB size (TBS), which is indicated by the MCS field set to one of the non-reserved states, the combination of toggling the NDI and setting MCS field to a reserved state would typically never occur. However, since there is a very low risk that this occurs due to error cases, the RV index may also be taken into account. Thus, the RV index (which is an example of a redundancy version field) may be set to a non-zero value. It is therefore suitable to use this combination of DCI information field set to these specific values to indicate that the PUSCH is a CSI only PUSCH transmission not comprising UL-SCH.

The use of the RV index is added simply to avoid misunderstandings if there are error cases and may be removed. If it is used to specify CSI-only PUSCH, requiring that the RV index is set to a non-zero value is advantageous since the combination of toggling the NDI is typically used with RVid=0 for normal PUSCH transmissions. To further reduce the probability of error cases, the RV index may be set to 1 since this RV is seldom used. An example RV order is RVid=0 for the initial transmission, RVid=2 for the first retransmission, RVid=3 for the second retransmission and RVid=1 for the third retransmission. This means that RVid=1 is typically only used for the third retransmission of a TB and is therefore seldom used for ordinary PUSCH transmissions.

An example embodiment in pseudo-code language is given below (note that references to tables and subclauses below are merely exemplary for understanding the pseudo-code and do not necessarily refer to a specific standard, document, etc., where at least the bolded portion below indicates, at least in part, the configuration of PUSCH without associated shared data, i.e., indicates the PUSCH without UL-SCH, for example):

Clause 6.1.4 Modulation order, redundancy version and transport block size determination To determine the modulation order, target code rate, redundancy version and transport block size for the physical uplink shared channel, the wireless device 22 shall first:

read the 5-bit "modulation and coding scheme" field in the DCI to determine the modulation order and target code rate (R) based on the procedure defined in Subclause 6.1.4.1 read "redundancy version" field (RVid) in the DCI to determine the redundancy version, and check the "CSI request" bit field and second the wireless device 22 shall use the number of layers, the total number of allocated PRBs to determine the transport block size based on the procedure defined in Subclause 6.1.4.2.

Subclause 6.1.4.1 Modulation order and target code rate determination

For the PUSCH is assigned by a DCI format 0_0/0_1 with CRC scrambled by C-RNTI,

If the higher layer parameters PUSCH-tp is disabled and MCS-Table-PUSCH is not set to '256QAM', the wireless device 22 shall use $I_{MCS}$ and Table 5.1.3.1-1 to determine the modulation order ($Q_m$) and Target code rate (R) used in the physical downlink shared channel.

elseif the higher layer parameters PUSCH-tp is disabled and MCS-Table-PUSCH is set to '256QAM', the wireless device 22 shall use $I_{MCS}$ and Table 5.1.3.1-2 to determine the modulation order ($Q_m$) and Target code rate (R) used in the physical downlink shared channel.

elseif the higher layer parameters PUSCH-tp is enabled and MCS-Table-PUSCH-transform-precoding is not set to '256QAM', the wireless device 22 shall use $I_{MCS}$ and Table 6.1.4.1-1 to determine the modulation order ($Q_m$) and Target code rate (R) used in the physical downlink shared channel.

else the wireless device 22 shall use $I_{MCS}$ and Table 5.1.3.1-2 to determine the modulation order ($Q_m$) and Target code rate (R) used in the physical downlink shared channel.

end

Subclause 6.1.4.2 Transport block size determination

For the PUSCH is assigned by a DCI format 0_0/0_1 with CRC scrambled by C-RNTI, if $0 \leq I_{MCS} \leq 27$ and the higher layer parameters PUSCH-tp is disabled and MCS-Table-PUSCH is set to '256QAM', or $0 \leq I_{MCS} \leq 27$ and the higher layer parameters PUSCH-tp is enabled and MCS-Table-PUSCH-transform-precoding is set to '256QAM', or $0 \leq I_{MCS} \leq 28$ and the higher layer parameters PUSCH-tp is disabled and MCS-Table-PUSCH is not set to '256QAM', or $0 \leq I_{MCS} \leq 27$ and the higher layer parameters PUSCH-tp is enabled and MCS-Table-PUSCH-transform-precoding is not set to '256QAM', the wireless device 22 shall first determine the TBS as specified below:

The wireless device 22 shall first determine the number of REs ($N_{RE}$) NRE within the slot:

A wireless device 22 first determines the number of REs allocated for PUSCH within a PRB ($N'_{RE}$) by $N'_{RE} = N_{sc}^{RB} * N_{symb}^{sh} - N_{DMRS}^{PRB} - N_{oh}^{PRB}$, where $N_{sc}^{RB} = 12$ is the number of subcarriers in the frequency domain in a physical resource block, $N_{symb}^{sh} N_{symb}^{slot}$ is the number of scheduled OFDM symbols in a slot, $N_{DMRS}^{PRB} N_{DMRS}^{PRB}$ is the number of REs for DM-RS per PRB in the scheduled duration including the overhead of the DM-RS CDM groups indicated by DCI format 0_0/0_1, and $N_{oh}^{PRB}$ is the overhead configured by higher layer parameter Xoh-PUSCH. If the Xoh-PUSCH is not configured (a value from 0, 6, 12, or 18), the Xoh-PDSCH is set to 0.

A wireless device 22 determines the quantized number of REs allocated for PUSCH within a PRB ($\bar{N}'_{RE}$ by Table 5.1.3.2-1)

A wireless device 22 determines the total number of REs allocated for PUSCH ($N_{RE}$) by $N_{RE} = \bar{N}'_{RE} * n_{PRB}$ where $n_{PRB}$ is the total number of allocated PRBs for the wireless device 22.

Next, proceed with steps 2-5 as defined in Subclause 5.1.3.2 elseif $28 \leq I_{MCS} \leq 31$ and the higher layer parameters PUSCH-tp is disabled and MCS-Table-PUSCH is set to '256QAM', or $28 \leq I_{MCS} \leq 31$ and the higher layer parameters PUSCH-tp is enabled and MCS-Table-PUSCH-transform-precoding is set to '256QAM', or $28 \leq I_{MCS} \leq 31$ and the higher layer parameters PUSCH-tp is enabled and MCS-Table-PUSCH-transform-precoding is not set to '256QAM', and the redundancy version RVid=1, the NDI bit is toggled and the CSI request field is present and indicates that a CSI report is triggered then there is no transport block for the UL-SCH and only the control information feedback for the current PUSCH reporting mode is transmitted by the wireless device 22.

elseif $28 \leq I_{MCS} \leq 31$ and the higher layer parameters PUSCH-tp is disabled and MCS-Table-PUSCH is set to '256QAM', or $28 \leq I_{MCS} \leq 31$ and the higher layer parameters PUSCH-tp is enabled and MCS-Table-PUSCH-transform-precoding is set to '256QAM', or $28 \leq I_{MCS} \leq 31$ and the higher layer parameters PUSCH-tp is enabled and MCS-Table-PUSCH-transform-precoding is not set to '256QAM', or the TBS is assumed to be as determined from the DCI transported in the latest PDCCH for the same transport block using $0 \leq I_{MCS} \leq 27$. If there is no PDCCH for the same transport block using $0 \leq I_{MCS} \leq 27$, and if the initial PUSCH for the same transport block is transmitted with configured semi-persistently scheduled, the TBS shall be determined from the most recent configured scheduling PDCCH.

else the TBS is assumed to be as determined from the DCI transported in the latest PDCCH for the same transport block using $0 \leq I_{MCS} \leq 28$. If there is no PDCCH for the same transport block using $0 \leq I_{MCS} \leq 28$, and if the initial PUSCH for the same transport block is transmitted with configured grant, the TBS shall be determined from the most recent configured scheduling PDCCH.

Thus, in some embodiments, a CSI only PUSCH without UL-SCH is indicated by

Toggling the New Data Indicator, NDI;

Setting the MCS field to a reserved state not indicating target code rate;

Triggering CSI reporting by setting the CSI request field not equal to zeros; and and (optionally) setting RVid to a certain value not equal to zero (such as 1).

SOME EXAMPLES

Example A1

A network node 16 configured to communicate with a wireless device 22, the network node 16 configured to, and/or comprising a radio interface 62 and/or comprising processing circuitry 68 configured to indicate channel state information, CSI, —only physical uplink shared channels, PUSCH, without uplink shared channels, UL-SCH, data by:
  toggling a new data indicator;
  setting a modulation and coding scheme field to a reserved state not indicating a target code rate; and
  triggering CSI reporting by setting a CSI request field not equal to zero.

Example A2

The network node 16 of Example A1, further comprising setting a redundancy version identification to a value not equal to zero.

Example B1

A communication system 10 including a host computer 24, the host computer 24 comprising:
  processing circuitry 42 configured to provide user data; and
  a communication interface 40 configured to forward the user data to a cellular network for transmission to a wireless device 22,
  the cellular network comprising a network node 16 having a radio interface 62 and processing circuitry 68, the network node 16 configured to, and/or the network node's processing circuitry 68 configured to indicate channel state information, CSI, —only physical uplink shared channels, PUSCH, without uplink shared channels, UL-SCH, by:
  toggling a new data indicator;
  setting a modulation and coding scheme field to a reserved state not indicating a target code rate; and
  triggering CSI reporting by setting a CSI request field not equal to zero.

Example B2

The communication system 10 of Example B1, further including the network node 16.

Example B3

The communication system 10 of Example B2, further including the wireless device 22, wherein the wireless device 22 is configured to communicate with the network node 16.

Example B4

The communication system 10 of Example B3, wherein:
  the processing circuitry 42 of the host computer is configured to execute a host application 50, thereby providing the user data; and
  the wireless device 22 comprises processing circuitry 84 configured to execute a client application 92 associated with the host application 50.

Example C1

A method implemented in a network node 16, the method comprising indicating channel state information, CSI, —only physical uplink shared channels, PUSCH, without uplink shared channels, UL-SCH, by:
  toggling a new data indicator;
  setting a modulation and coding scheme field to a reserved state not indicating a target code rate; and
  triggering CSI reporting by setting a CSI request field not equal to zero.

Example C2

The method of Example C1, further comprising setting a redundancy version identification to a value not equal to zero.

Example D1

A method implemented in a communication system including a host computer 24, a network node 16 and a wireless device 22, the method comprising:
  at the host computer 24, providing user data; and
  at the host computer 24, initiating a transmission carrying the user data to the wireless device 22 via a cellular network comprising the network node 16, wherein the network node 16 configured to indicate channel state information, CSI, —only physical uplink shared channels, PUSCH, without uplink shared channels, UL-SCH, by:
  toggling a new data indicator;
  setting a modulation and coding scheme field to a reserved state not indicating a target code rate; and
  triggering CSI reporting by setting a CSI request field not equal to zero.

Example D2

The method of Example D1, further comprising, at the network node 16, transmitting the user data.

Example D3

The method of Example D2, wherein the user data is provided at the host computer 24 by executing a host application 50, the method further comprising, at the wireless device 22, executing a client application 92 associated with the host application 50.

Example E1

A wireless device 22 configured to communicate with a network node 16, the wireless device 22 configured to, and/or comprising a radio interface 82 and/or processing circuitry 84 configured to configured to detect if channel state information, CSI, —only physical uplink shared channels, PUSCH, without uplink shared channels, UL-SCH, have been selected by a network node 16 by detecting:
  a toggling of a new data indicator;
  a setting of a modulation and coding scheme field to a reserved state not indicating a target code rate; and
  a setting of a CSI request field being not equal to zero.

Example E2

The wireless device 22 of Example E1, further comprising detecting a setting of a redundancy version identification to a value not equal to zero.

Example F1

A communication system 10 including a host computer 24, the host computer 24 comprising:
  processing circuitry 42 configured to provide user data; and
  a communication interface 40 configured to forward user data to a cellular network for transmission to a wireless device 22,
  the wireless device 22 configured to, and/or comprising a radio interface 82 and/or processing circuitry 84 configured to detect if channel state information, CSI, —only physical uplink shared channels, PUSCH, without uplink shared channels, UL-SCH, have been selected by a network node 16 by detecting:
  a toggling of a new data indicator;
  a setting of a modulation and coding scheme field to a reserved state not indicating a target code rate; and
  a setting of a CSI request field being not equal to zero.

Example F2

The communication system 10 of Example F1, further including the wireless device 22.

Example F3

The communication system 10 of Example F2, wherein the cellular network further includes a network node 16 configured to communicate with the wireless device 22.

Example F4

The communication system 10 of Example F2 or F3, wherein:
  the processing circuitry 42 of the host computer 24 is configured to execute a host application 50, thereby providing the user data; and
  the wireless device's processing circuitry 84 is configured to execute a client application 92 associated with the host application 50.

Example G1

A method implemented in a wireless device 22, the method comprising detecting if channel state information, CSI, —only physical uplink shared channels, PUSCH, without uplink shared channels, UL-SCH, have been selected by a network node 16 by detecting:
  a toggling of a new data indicator;
  a setting of a modulation and coding scheme field to a reserved state not indicating a target code rate; and
  a setting of a CSI request field being not equal to zero.

Example G2

The method of Example G1, further comprising detecting a setting of a redundancy version identification to a value not equal to zero.

Example H1

A network node 16, comprising:
  a memory module 73 configured to downlink control information;
  a downlink control information configuration module 33 configured to indicate in the downlink control information, channel state information, CSI, —only physical uplink shared channels, PUSCH, without uplink shared channels, UL-SCH, by:
    toggling a new data indicator;
    setting a modulation and coding scheme field to a reserved state not indicating a target code rate; and
    triggering CSI reporting by setting a CSI request field not equal to zero.

Example H2

A wireless device 22, comprising:
  a memory module 89 configured to store downlink control information;
  a downlink control information configuration module configured to detect if channel state information, CSI, —only physical uplink shared channels, PUSCH, without uplink shared channels, UL-SCH, have been selected by a network node by detecting:
    a toggling of a new data indicator;
    a setting of a modulation and coding scheme field to a reserved state not indicating a target code rate; and
    a setting of a CSI request field being not equal to zero.

Appendix—Corrections for CSI Reporting

7 Indication of CSI-only PUSCH

CSI reporting on PUSCH is supported in NR either multiplexed with UL-SCH or by itself according to the agreement below:
Agreements:
1. RAN1 supports aperiodic CSI report on PUSCH, including two cases:
   a. Case-1: CSI reports multiplexing with uplink data in PUSCH
   b. Case-2: CSI reports only in PUSCH (no uplink data)
   c. Note: how to multiplex UCI with PUSCH is under discussing in UCI multiplexing A.I.
2. FFS: aperiodic CSI report on PUCCH
Furthermore, modulation order determination for CSI-only PUSCH is determined using the same way as when PUSCH also contains UL-SCH data:
Agreements:
  For aperiodic CSI on PUSCH triggered by an UL grant without UL-SCH data, the modulation order for PUSCH is handled the same way as the case when PUSCH is with UL-SCH data
One remaining issue is how to indicate to the UE in the DCI that PUSCH should contain CSI only and not UL-SCH.

In LTE, CSI-only on PUSCH without UL-SCH is also supported. To indicate that the UE shall transmit PUSCH as such, the DCI indicates that $I_{MCS}$=29 (which sets RVid=1 and has a reserved state for modulation order and TBS in the jointly encoded MCS and RV field) in conjunction with that the number of PUSCH repetitions is set to N=1 as well as that the CSI request field indicates that a CSI report is triggered. As RV and MCS is jointly encoded in the MCS field, there is no possibility to set an MCS value in case of CSI-only PUSCH in LTE, and QPSK is always used in that case, which is a limitation. For NR, obviously a different approach must be used since MCS and RV are separately encoded in the DCI.

Observation 1 LTE approach for indicating CSI only PUSCH cannot be used directly for NR since the DCI fields are different As A-CSI can be multiplexed with UL-SCH on PUSCH, for both initial and re-transmissions of an UL-SCH transport block, indicating that CSI only is transmitted should be done in such a fashion that it does not limit the scheduling flexibility of UL-SCH.

Since only modulation order and not coding rate needs to be indicated for CSI-only PUSCH (the CSI payload is known and the coding rate is given implicitly be the resource allocation), one way to differentiate a DCI scheduling a CSI-only PUSCH is by setting the MCS value to one of the reserved states ($28 \leq I_{MCS} \leq 31$) which only indicates a modulation order and not a coding rate/TBS. These states are normally used for indicating a retransmission of a UL-SCH TB and so only using this as a differentiation criterion is not enough. However, for a retransmission, the New Data Indicator (NDI) would have the same value as the previously received DCI (of the initial transmission), i.e. it would not be toggled to indicate that the UE should transmit new data.

Observation 2 The MCS field set to one of the reserved states and toggling of the NDI bit never occurs in a regular UL grant Thus, $28 \leq I_{MCS} \leq 31$ and toggling of the NDI bit, together with the CSI request field indicating that a report is triggered could be used as criterion to indicate that no UL-SCH TB is present and UE shall transmit CSI only on the PUSCH. To further protect against possible error cases, one could additionally require that the RVid is set to 1, as toggling of the NDI bit would typically also be accompanied by RVid=0 in a regular UL grant.

Proposal 8 An UL grant scheduling CSI only on PUSCH without UL-SCH is identified by toggling of the NDI, $28 \leq I_{MCS} \leq 31$, RVid=1 and CSI request field triggering a CSI report The above proposal is implemented with the text proposal below:

For 3GPP TS 38.214:

>>>>>>>>>>>>>Start text proposal 9>>>>>>>>>>>>>>

7.1.1.1 6.1.4.2 Transport block size determination

For the PUSCH is assigned by a DCI format 0_0/0_1 with CRC scrambled by C-RNTI, if
- $0 \leq I_{MCS} \leq 27$ and the higher layer parameters PUSCH-tp is disabled and MCS-Table-PUSCH is set to '256QAM', or
- $0 \leq I_{MCS} \leq 27$ and the higher layer parameters PUSCH-tp is enabled and MCS-Table-PUSCH-transform-precoding is set to '256QAM', or
- $0 \leq I_{MCS} \leq 28$ and the higher layer parameters PUSCH-tp is disabled and MCS-Table-PUSCH is not set to '256QAM', or
- $0 \leq I_{MCS} \leq 27$ and the higher layer parameters PUSCH-tp is enabled and MCS-Table-PUSCH-transform-precoding is not set to '256QAM', the UE shall first determine the TBS as specified below:

The UE shall first determine the number of REs ($N_{RE}$) NRE) within the slot:
- A UE first determines the number of REs allocated for PUSCH within a PRB ($N'_{RE}$) by $N'_{RE} = N_{sc}^{RB} * N_{symb}^{sh} - N_{DMRS}^{PRB} - N_{oh}^{PRB}$, where $N_{sc}^{RB} = 12$ is the number of subcarriers in the frequency domain in a physical resource block, $N_{symb}^{sh}$ $N_{symb}^{slot}$ is the number of scheduled OFDM symbols in a slot, $N_{DMRS}^{PRB}$ $N_{DMRS}^{PRB}$ is the number of REs for DM-RS per PRB in the scheduled duration including the overhead of the DM-RS CDM groups indicated by DCI format 0_0/0_1, and $N_{oh}^{PRB}$ is the overhead configured by higher layer parameter Xoh-PUSCH. If the Xoh-PUSCH is not configured (a value from 0, 6, 12, or 18), the Xoh-PDSCH is set to 0.
- A UE determines the quantized number of REs allocated for PUSCH within a PRB ($\overline{N}'_{RE}$ by Table 5.1.3.2-1)
- A UE determines the total number of REs allocated for PUSCH ($N_{RE}$) by $N_{RE} = \overline{N}'_{RE} * n_{PRB}$ where $n_{PRB}$ is the total number of allocated PRBs for the UE.
- Next, proceed with steps 2-5 as defined in Subclause 5.1.3.2 else if
- $28 \leq I_{MCS} \leq 31$ and the higher layer parameters PUSCH-tp is disabled and MCS-Table-PUSCH is set to '256QAM', or
- $28 \leq I_{MCS} \leq 31$ and the higher layer parameters PUSCH-tp is enabled and MCS-Table-PUSCH-transform-precoding is set to '256QAM', or
- $28 \leq I_{MCS} \leq 31$ and the higher layer parameters PUSCH-tp is enabled and MCS-Table-PUSCH-transform-precoding is not set to '256QAM', and the redundancy version rv=1, the NDI bit is toggled and the CSI request field is present and indicates that a CSI report is triggered then there is no transport block for the UL-SCH and only the control information feedback for the current PUSCH reporting mode is transmitted by the UE.

else if
- $28 \leq I_{MCS} \leq 31$ and the higher layer parameters PUSCH-tp is disabled and MCS-Table-PUSCH is set to '256QAM', or
- $28 \leq I_{MCS} \leq 31$ and the higher layer parameters PUSCH-tp is enabled and MCS-Table-PUSCH-transform-precoding is set to '256QAM', or
- $28 \leq I_{MCS} \leq 31$ and the higher layer parameters PUSCH-tp is enabled and MCS-Table-PUSCH-transform-precoding is not set to '256QAM', or the TBS is assumed to be as determined from the DCI transported in the latest PDCCH for the same transport block using $0 \leq I_{MCS} \leq 27$. If there is no PDCCH for the same transport block using $0 \leq I_{MCS} \leq 27$, and if the initial PUSCH for the same transport block is transmitted with configured semi-persistently scheduled, the TBS shall be determined from the most recent configured scheduling PDCCH.

else
the TBS is assumed to be as determined from the DCI transported in the latest PDCCH for the same transport block using $0 \leq I_{MCS} \leq 28$. If there is no PDCCH for the same transport block using $0 \leq I_{MCS} \leq 28$, and if the initial PUSCH for the same transport block is transmitted with configured grant, the TBS shall be determined from the most recent configured scheduling PDCCH.

>>>>>>>>>>>>>>End text proposal 9>>>>>>>>>>>>>>

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A method performed by a network node for indicating channel state information, CSI, reporting without associated shared channel data, the method comprising:

toggling a new data indicator;

setting a modulation and coding scheme field, the set modulation and coding scheme field lacking an indication of a target code rate; and indicating channel state information, CSI, reporting, the indication comprising the toggled new data indicator and the set modulation and coding scheme field to a wireless device, the indication being indicated in downlink control information, DCI, that is configured to omit an indication of a transport block size for the shared channel data.

2. The method of claim 1, further comprising receiving CSI reporting based on the indication for CSI reporting.

3. The method of claim 1, further comprising setting a CSI request field to trigger CSI reporting as part of the indication, for CSI reporting, of the configuration of the PUSCH without the associated shared channel data.

4. The method of claim 3, wherein the CSI request field is set to include at least one non-zero value.

5. The method of claim 1, further comprising setting a redundancy version field to a predefined value as part of the indication, for CSI reporting, of the configuration of the PUSCH without the associated shared channel data.

6. The method of claim 5, wherein the redundancy version field is set to 1.

7. The method of claim 1, wherein the new data indicator and the modulation and coding scheme field are included in downlink control information, DCI.

8. A method performed by a wireless device for channel state information, CSI, reporting, without associated shared channel data, the method comprising:
    receiving a new data indicator and modulation and coding scheme, MCS, field; and
    determining an indication for channel state information reporting without associated shared channel data at least in part based on the new data indicator being toggled and the MCS field lacking an indication of a target code rate, the indication being indicated in downlink control information, DCI, that is configured to omit an indication of a transport block size for the shared channel data.

9. The method of claim 8, further comprising transmitting CSI reporting based on the indication for CSI reporting.

10. The method of claim 8, wherein the indication for CSI reporting further corresponds to a setting of a CSI request field to trigger CSI reporting.

11. The method of claim 10, wherein the CSI request field is set to include at least one non-zero value.

12. The method of claim 8, wherein the indication further corresponds to a setting of a redundancy version field to a non-zero value as part of the indication, for CSI reporting, of the configuration of the PUSCH without the associated shared channel data.

13. The method of claim 12, wherein the redundancy version field is set to 1.

14. The method of claim 8, wherein the new data indicator and the modulation and coding scheme field are included in downlink control information, DCI.

15. The method of claim 8, further comprising optionally transmitting CSI reporting based at least in part on the indication.

16. A network node configured to communicate with a wireless device, the network node comprising:
    processing circuitry configured to:
        indicate, for channel state information, CSI, reporting, a configuration of a physical uplink shared channel, PUSCH, without associated shared channel data, at least in part by:
    toggling a new data indicator; and
    setting a modulation and coding scheme field, the set modulation and coding scheme field lacking an indication of a target code rate, the indication being indicated in downlink control information, DCI, that is configured to omit an indication of a transport block size for the shared channel data.

17. The network node according to claim 16, wherein the processing circuitry is further configured to receive CSI reporting based on the indication for CSI reporting.

18. A wireless device configured to communicate with a network node, the wireless device comprising:
    processing circuitry configured to:
        receive an indication, for channel state information, CSI, reporting, of a configuration of a physical uplink shared channel, PUSCH, without associated shared channel data, the indication corresponding at least in part to:
    a toggling of a new data indicator; and
    a setting of a modulation and coding scheme field, the set modulation and coding scheme field lacking an indication of a target code rate, the indication being indicated in downlink control information, DCI, that is configured to omit an indication of a transport block size for the shared channel data.

\* \* \* \* \*